(12) United States Patent
Fiske

(10) Patent No.: US 12,395,320 B2
(45) Date of Patent: *Aug. 19, 2025

(54) MULTIPARTY KEY EXCHANGE

(71) Applicant: Michael Stephen Fiske, San Francisco, CA (US)

(72) Inventor: Michael Stephen Fiske, San Francisco, CA (US)

(73) Assignee: Fiske Software LLC, San Francisco, CA (US)

( * ) Notice: Subject to any disclaimer, the term of this patent is extended or adjusted under 35 U.S.C. 154(b) by 1027 days.

This patent is subject to a terminal disclaimer.

(21) Appl. No.: 17/399,064

(22) Filed: Aug. 11, 2021

(65) Prior Publication Data

US 2021/0377009 A1    Dec. 2, 2021

Related U.S. Application Data

(63) Continuation-in-part of application No. 16/133,673, filed on Sep. 17, 2018, now Pat. No. 11,140,141.

(Continued)

(51) Int. Cl.
  *H04L 9/08*  (2006.01)
  *H04L 9/14*  (2006.01)
  *H04L 9/30*  (2006.01)

(52) U.S. Cl.
  CPC ............ *H04L 9/0825* (2013.01); *H04L 9/085* (2013.01); *H04L 9/14* (2013.01); *H04L 9/3093* (2013.01)

(58) Field of Classification Search
  CPC ......... H04L 9/0825; H04L 9/085; H04L 9/14; H04L 9/3066; H04L 9/0838; H04L 2209/46; H04L 63/065

See application file for complete search history.

(56) References Cited

U.S. PATENT DOCUMENTS 9,698,986 B1 *  7/2017  Gutoski ................ H04L 9/3093
2004/0098440 A1 *  5/2004  Koc ........................ G06F 7/5324
                                                                708/620

(Continued)

OTHER PUBLICATIONS

Steiner M, Tsudik G, Waidner M. Diffie-Hellman key distribution extended to group communication. In Proceedings of the 3rd ACM conference on Computer and communications security Jan. 1, 1996 (pp. 31-37). (Year: 1996).*

(Continued)

*Primary Examiner* — Robert B Leung

(57) ABSTRACT

This invention pertains to secure communications between multiple parties and/or secure computation or data transmission between multiple computers or multiple vehicles. This invention provides a secure method for three or more parties to establish one or more shared secrets between all parties. In some embodiments, there are less than 40 parties and in other embodiments there are more than 1 million parties that establish a shared secret. In some embodiments, establishing a shared secret among multiple parties provides a method for a secure conference call. In some embodiments, a shared secret is established with multiple computer nodes across the whole earth to help provide a secure Internet infrastructure that can reliably and securely route Internet traffic. In some embodiments, a shared secret is established so that self-driving vehicles may securely communicate and securely coordinate their motion to avoid collisions. In some embodiments, a shared secret is established with multiple computer nodes that participate as a network, performing blockchain computations.

22 Claims, 13 Drawing Sheets

4-Party Key Exchange

Step 9

Related U.S. Application Data

(60) Provisional application No. 62/559,641, filed on Sep. 18, 2017.

(56) References Cited

U.S. PATENT DOCUMENTS

| | | | | |
|---|---|---|---|---|
| 2004/0139132 | A1* | 7/2004 | Lutkenhaus | G06F 7/588 708/250 |
| 2005/0117745 | A1* | 6/2005 | Lee | H04L 9/304 380/30 |
| 2007/0186109 | A1* | 8/2007 | Nyberg | H04L 9/0844 713/171 |
| 2009/0154711 | A1* | 6/2009 | Jho | H04L 9/083 380/44 |
| 2013/0094649 | A1* | 4/2013 | Tomlinson | H04L 9/304 380/30 |
| 2014/0302774 | A1* | 10/2014 | Burke | G07C 5/08 455/3.05 |
| 2015/0261502 | A1* | 9/2015 | Sartor | G06F 7/588 359/107 |
| 2015/0358158 | A1* | 12/2015 | Fadaie | H04L 9/0838 713/171 |
| 2018/0026784 | A1* | 1/2018 | Ward | H04L 9/14 713/171 |

OTHER PUBLICATIONS

Just M, Vaudenay S. Authenticated multi-party key agreement. In International Conference on the Theory and Application of Cryptology and Information Security Nov. 3, 1996 (pp. 36-49). Springer, Berlin, Heidelberg. (Year: 1996).*

Asokan N, Ginzboorg P. Key agreement in ad hoc networks. Computer communications. Nov. 1, 2000; 23(17):1627-37. (Year: 2000).*

Lin CH, Lin HH, Chang JC. Multiparty key agreement for secure teleconferencing. In 2006 IEEE International Conference on Systems, Man and Cybernetics Oct. 8, 2006 (vol. 5, pp. 3702-3707). IEEE. (Year: 2006).*

Biswas G.P. Diffie-Hellman technique: extended to multiple two-party keys and one multi-party key. IET Information Security. Mar. 1, 2008; 2(1):12-8. (Year: 2008).*

Sun Z, Huang J, Wang P. Efficient multiparty quantum key agreement protocol based on commutative encryption. Quantum Information Processing. May 1, 2016; 15(5):2101-11. (Year: 2016).*

Becker K, Wille U. Communication complexity of group key distribution. In Proceedings of the 5th ACM Conference on Computer and Communications Security Nov. 1, 1998 (pp. 1-6). (Year: 1998).*

Harn, L., & Lin, C. (2014). Efficient group Diffie-Hellman key agreement protocols. Computers & Electrical Engineering, 40(6), 1972-1980. (Year: 2014).*

* cited by examiner

4-Party Key Exchange
Step 4

4-Party Key Exchange
Step 9

Light Emitting Diode 702

FIG. 9

McEliece hidden-Goppa-code public key cryptography

| $b$ | Size of Public Key (bits) $(b \log_2 b)^2$ | Classical Complexity $2^b$ operations | Quantum Complexity $(\frac{1}{2}) 2^b$ operations |
| --- | --- | --- | --- |
| 128 | $(128 * 7)^2 = 802,816$ | $3.4 \times 10^{38}$ | $1.7 \times 10^{38}$ |
| 256 | $(256 * 8)^2 = 4,194,304$ | $1.16 \times 10^{77}$ | $5.8 \times 10^{76}$ |
| 512 | $(512 * 9)^2 = 21,233,664$ | $1.34 \times 10^{154}$ | $6.7 \times 10^{153}$ |

MULTIPARTY KEY EXCHANGE

1 RELATED APPLICATIONS

This application claims priority benefit of U.S. Provisional Patent Application Ser. No. 62/559,641, entitled "Multi Party Key Exchange", filed Sep. 18, 2017, which is incorporated herein by reference. This application is a continuation-in-part of U.S. Non-provisional patent application Ser. No. 16/133,673, entitled "Multiparty Key Exchange", filed Sep. 17, 2018, which is incorporated herein by reference.

2 BACKGROUND-FIELD OF INVENTION

The present invention relates broadly to protecting the privacy of information and devices and infrastructure systems such as the Internet. The processes and device are generally used to maintain the privacy and integrity of information transmitted through communication and transmission systems and Internet routing systems.

3 BRIEF SUMMARY OF THE INVENTION

This invention describes multiparty key exchange processes and systems. In some embodiments, a multiparty key exchange process or system securely establishes a common shared secret between 3 or more parties. In some embodiments, there may be 1024 entities in the multiparty exchange; this is called a 1024-party exchange. In some embodiments, there may be as many as 1 million entities in the exchange; this is called a 1 million-party exchange. In some embodiments, the multiparty public keys, that comprise multiparty exchange, may be transmitted via IP (internet protocol). These processes and devices also may be used to compute passive multiparty public keys stored on a computer or another physical device such as a tape drive. In some embodiments, symmetric cryptographic methods and machines are also used to supplement a multiparty key exchange; for example, one-way hash functions may help compute the shared secrets between multiple parties.

Typically, the information—multiparty public key(s)—are computed by multiple sending parties, called Alice, Bob, Ella, Fred, Joanne, Kate, and so on. When there is a multiparty exchange that involves a large number of participants, the symbols $P_1, P_2, P_3 \ldots, P_n$ may be used instead of human names. Symbol $P_1$ refers to the first party in the multiparty exchange. Symbol $P_2$ refers to the second party. Symbol $P_3$ refers to the third party. Symbol $P_n$ refers to the nth party.

In an embodiments, Alice broadcasts one or more multiparty public key(s) to one or more receiving parties, called Bob, Ella, Fred, Joanne, Kate and other parties. The receiving parties execute multiparty receiving machine instructions on their devices. The output of this exchange or process, executed on their devices, securely establishes a shared secret among multiple parties. Eve is the name of the agent who is attempting to obtain or capture the public keys transmitted between Alice, Bob, Ella, Fred, Joanne, Kate, and other parties. A primary goal of Alice, Bob, Ella, Fred, Joanne, Kate and other parties is to assure that Eve cannot capture the shared secret established between these multiple parties.

In an embodiment, a multiparty key exchange establishes a shared secret between multiple parties, enabling the parties to make a secure encrypted voice conference call so that an eavesdropper is unable to listen to the conversation even when the eavesdropper has access to the encrypted voice data. In an embodiment, a multiparty key exchange establishes a shared secret with multiple computer nodes across the whole earth, enabling a secure Internet infrastructure that can reliably and securely route Internet traffic.

4 BACKGROUND-PRIOR ART

The subject matter discussed in this background section should not be assumed to be prior art merely as a result of its mention in the background section. Similarly, a problem mentioned in the background section or associated with the subject matter of the background section should not be assumed to have been previously recognized in the prior art. The subject matter in the "ADVANTAGES and FAVORABLE PROPERTIES" section represents different approaches, which in and of themselves may also be inventions, and various properties, which may have been first recognized by the inventor.

One of the better known prior art methods performs broadcast encryption with bilinear maps [1]. As a consequence of using bilinear maps instead of commutative groups and their implementation of bilinear maps, the public size is linear in the number of recipients of the broadcast. This means if one starts with a standard 256-bit equivalent public key for one user, then this converts to a 256 kilobit key for 1,000 users. This makes this prior art method not feasible for an Internet infrastructure when there are 10,000 or more parties.

5 ADVANTAGES AND FAVORABLE PROPERTIES

Overall, our invention(s) provides a multiparty public key exchange with the following favorable security and functionality properties.

Perhaps, the most significant advantage over the prior art is that the public key sizes for this invention do not increase as a function of the number of parties. This means a 1 million-party exchange is feasible, enabling secure Internet routing infrastructure. This is an extremely difficult problem with the prior art methods that use quantum computing resistant public key cryptography.

As an example, McEliece hidden-Goppa-code ([20]) public key cryptography [21] is a post-quantum cryptography that is about 40 years old. Up to the present time, it has been cryptographically resistant to all known quantum algorithms [18, 19]. To break codes of length n, the best known attack takes $2^b$ operations where n is at least $(2+o(1))b \log_2 b$. McEliece's public key uses roughly $$\frac{n^2}{4} \approx (b \log_2 b)^2 \text{ bits.}$$

As shown in FIG. 9, the public key size for McEliece hidden-Goppa-code cryptography is 4,194,304 bits to obtain a quantum complexity of $5.8 \times 10^{76}$. For a prior art exchange (e.g., bilinear maps) that involves 1,000 computer nodes, each public key requires over 4 billion bits of memory.

This invention's system design decentralizes the security to each user so that Alice, Bob, Ella, Fred and other parties (i.e., multiparty), possess their sources of randomness. Decentralization of the private and public key generation helps eliminate potential single points of failure, and backdoors in the transmission medium that may be outside the inspection and control of Alice, Bob, Ella, Fred and other parties.

Our key exchange system does not use a centralized authority to create public or establish shared secrets between multiple parties. This decentralization and lack of a centralized authority helps hinder man-in-the-middle attacks and backdoors that are common in centralized authority systems.

Our multiparty key exchange system works with any public key cryptography; it does not depend on any particular public key cryptography such as RSA or elliptic curve or lattice-based cryptography.

Our multiparty key exchange system not only enables all the parties involved in the exchange to securely communicate but it also allows proper subsets of the parties involved in the exchange to communicate without the other parties able to eavesdrop. This is a quite useful property during a voice conference call, where two parties Alice and Bob may want to communicate to each other in real-time on the conference call so that the other parties on the call cannot listen to what they are saying. For example, Alice might be explaining something on the call that Bob does not want to disclose to the others. This selectivity of secure communication also has useful applications in the secure routing of Internet traffic.

6 BRIEF DESCRIPTION OF DRAWINGS

In the following drawings, although they may depict various examples of the invention, the invention is not limited to the examples depicted in the drawings.

Figure 4:
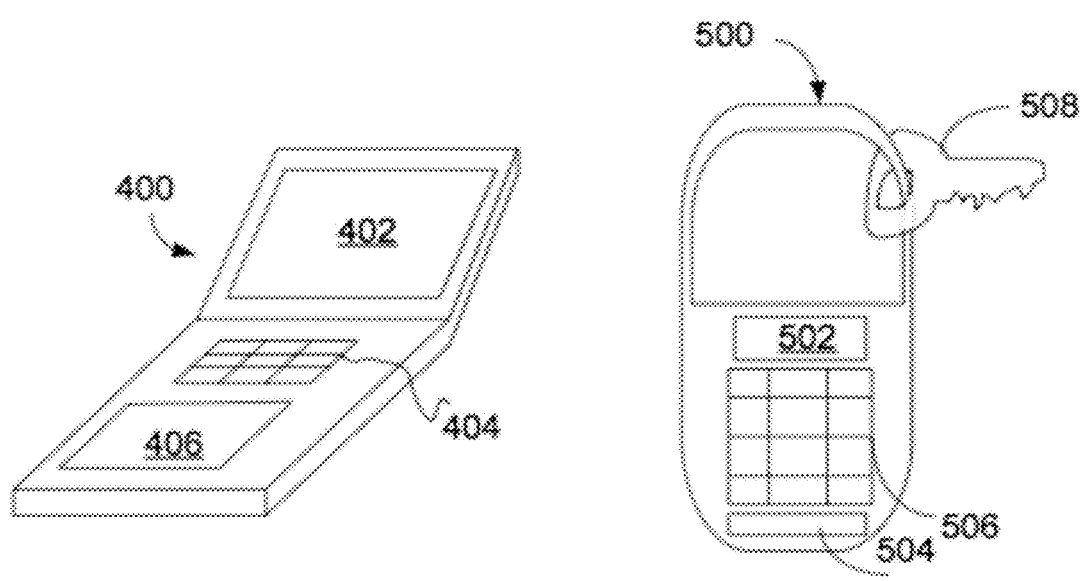

FIG. 4 shows a mobile phone embodiment 400 that executes a multiparty key exchange for the purpose of a private voice conference call. Mobile phone embodiment 400 transmits the multiparty public keys wirelessly. Mobile phone embodiment 400 may include the sending and/or receiving machines of FIG. 1A.

Figure 5A:
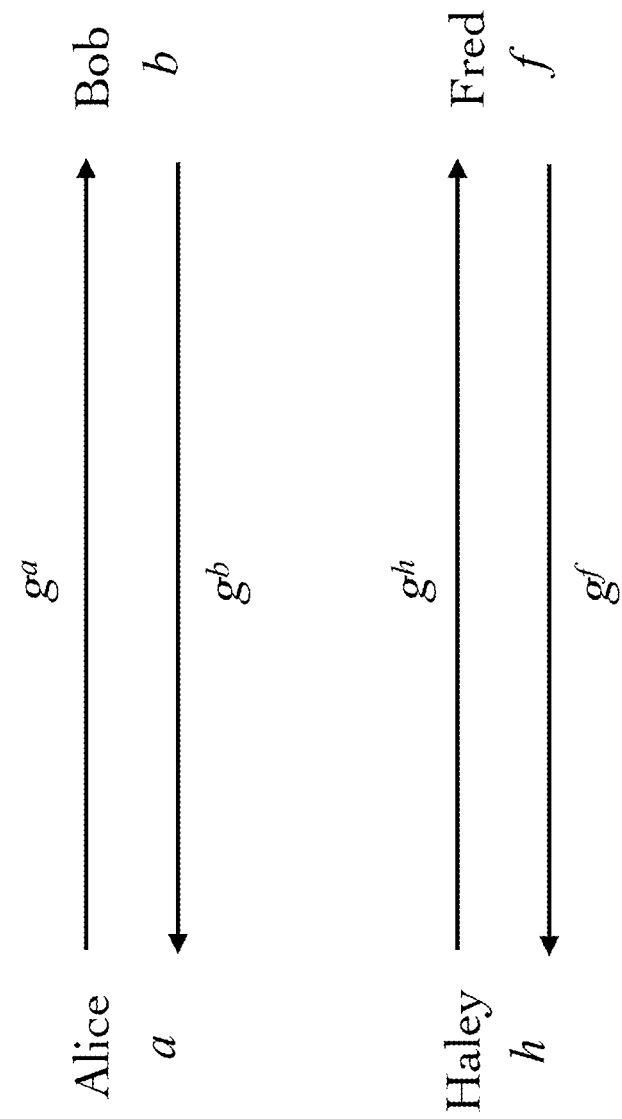

FIG. 5a shows step 4 of a 4-party key exchange between Alice, Bob, Fred and Haley.

Figure 5B:
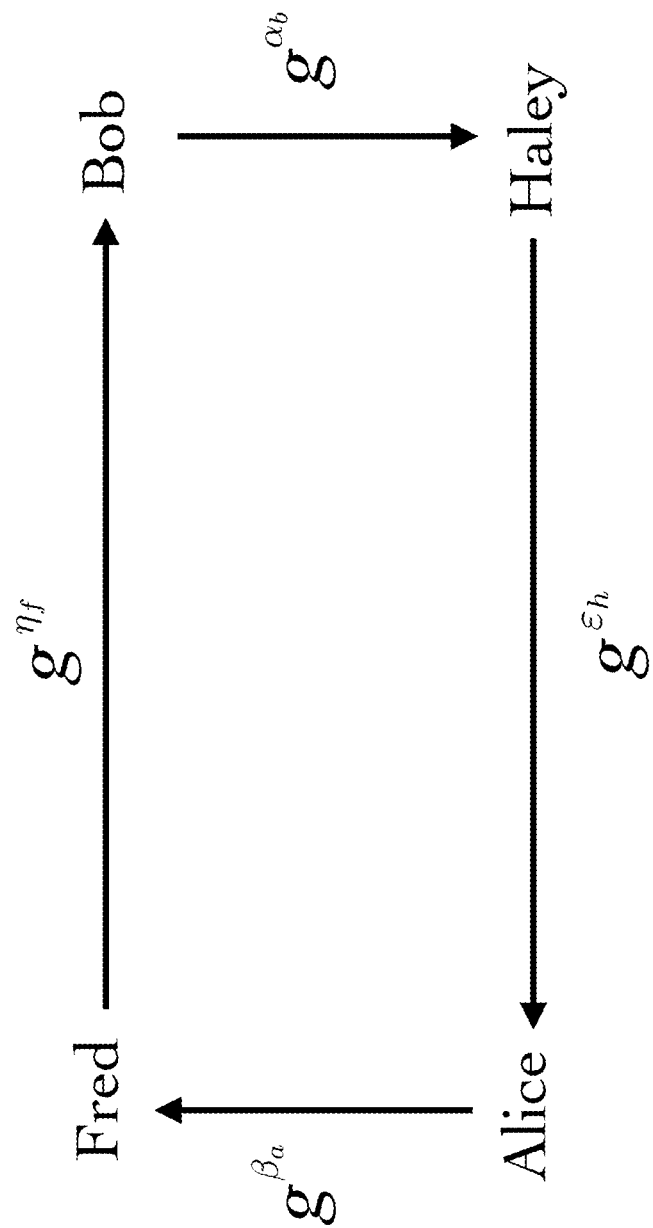

FIG. 5b shows step 9 of a 4-party key exchange where Bob sends his multiparty public key to Haley; Haley sends her multiparty public key to Alice; Alice sends her multiparty public key to Fred; and Fred sends his multiparty public key to Bob.

Figure 6A:
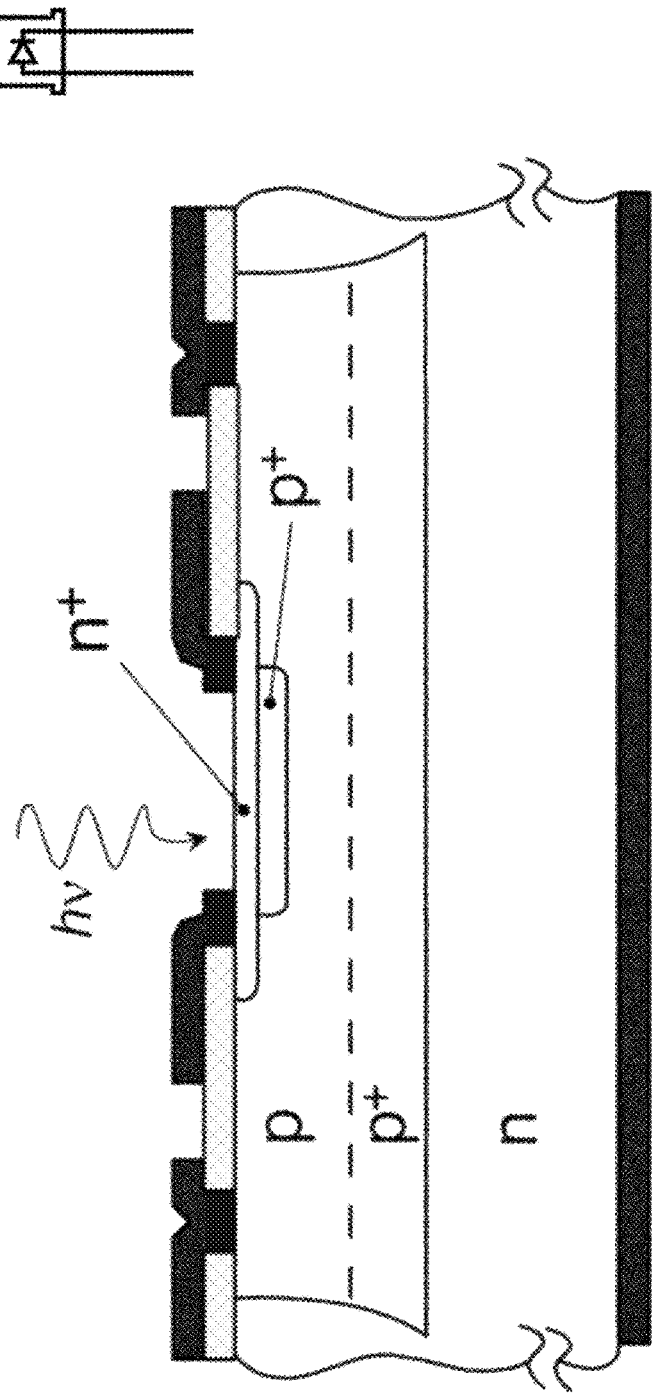

FIG. 6A shows an embodiment of a non-deterministic generator, based on quantum randomness. Non-deterministic generator 642 is based on the behavior of photons to help generate one or more private keys. Non-deterministic generator 642 contains a light emitting diode 646 that emits photons and a phototransistor 644 that absorbs photons.

Figure 6B:
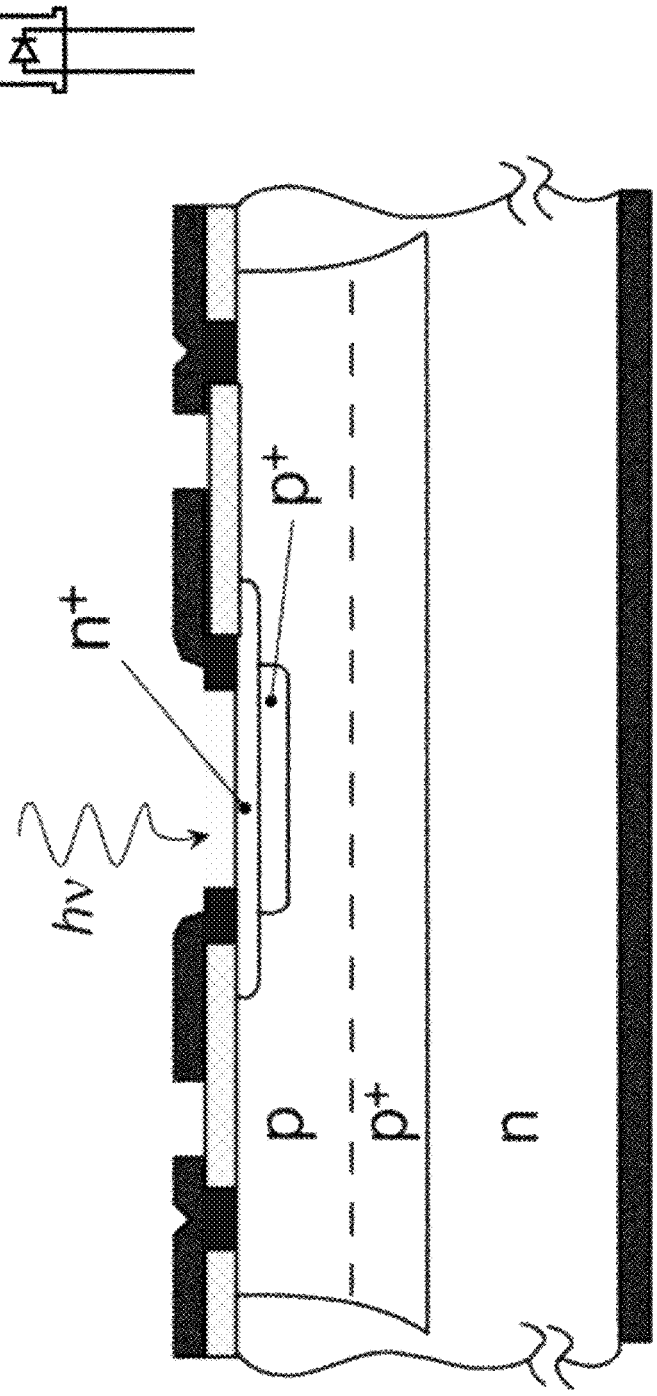

FIG. 6B shows an embodiment of a non-deterministic generator, based on quantum randomness. Non-deterministic generator 652 is based on the behavior of photons to help generate one or more private keys. Non-deterministic generator 652 contains a light emitting diode 656 that emits photons and a phototdiode 654 that absorbs photons.

Figure 7:
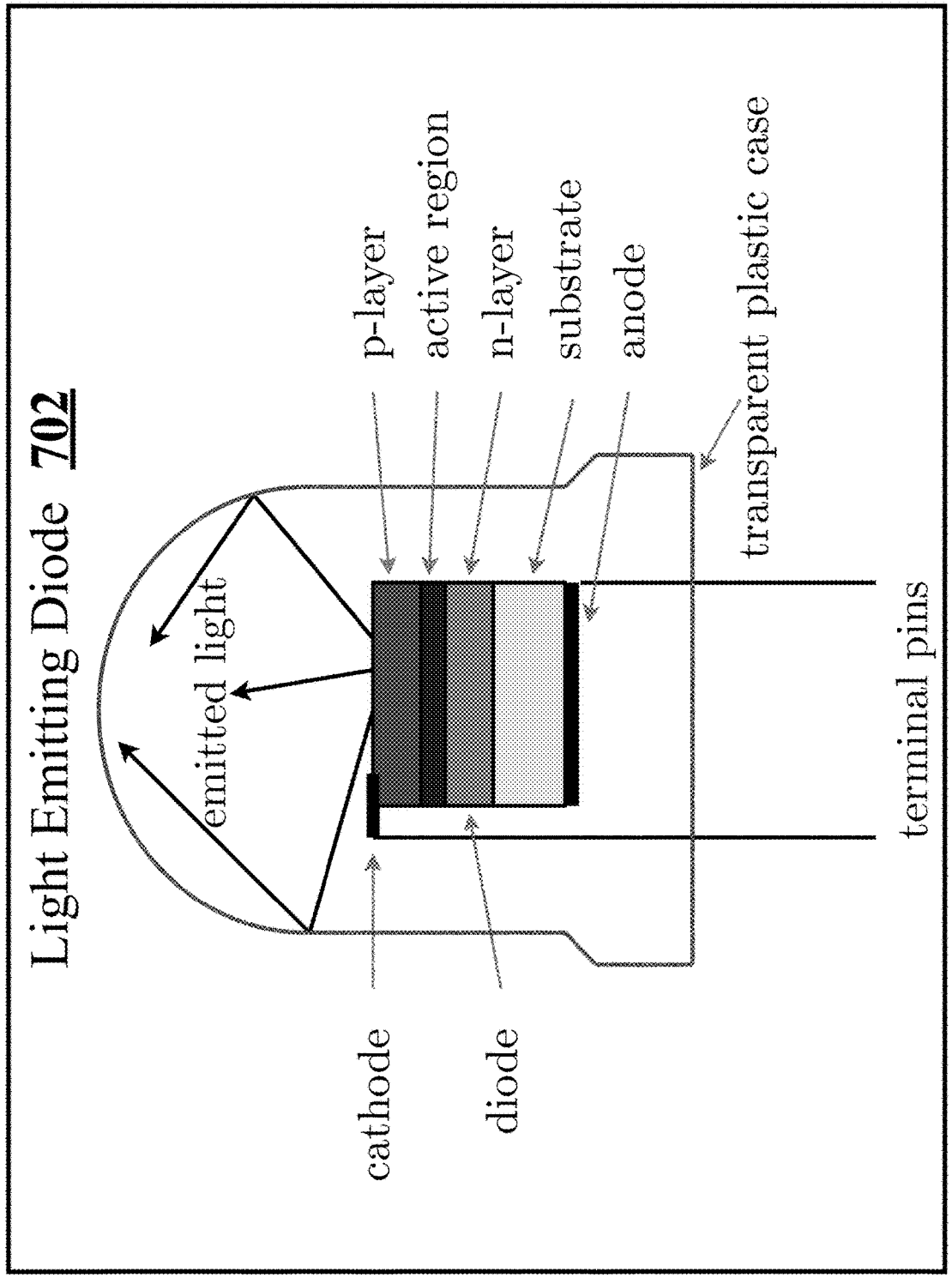

FIG. 7 shows a light emitting diode 702, which emits photons. In some embodiments, LED 702 is part of the random number generator, which is used to generate private keys.

Figure 8:
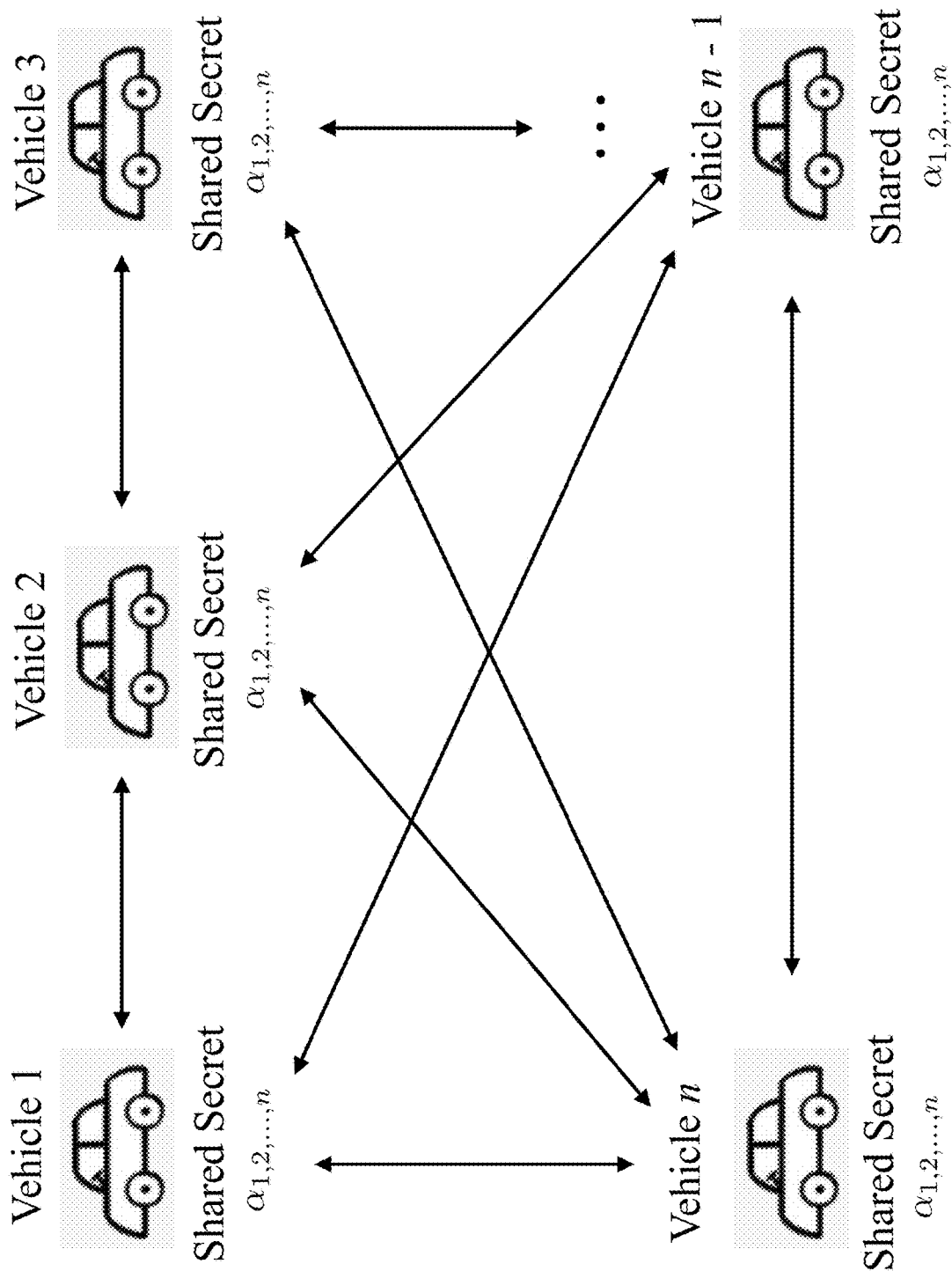

FIG. 8 shows n self-driving vehicles that have used a multiparty key exchange to establish shared secrets between the self-driving vehicles. The shared secrets help prevent a rogue vehicle or rogue communication from an unauthorized vehicle or unauthorized computer from subverting the communication or driving directions of the self-driving vehicles.

FIG. 9 shows a complexity table for McEliece hidden-Goppa-code public key cryptography—a post-quantum public key cryptography. For b=128, row 1 shows the classical complexity (column 3) and quantum complexity (column 4) for McEliece hidden-Goppa-code cryptography. For b=256, row 2 shows the classical complexity (column 3) and quantum complexity (column 4). For b=512, row 3 shows the classical complexity (column 3) and quantum complexity (column 4).

7 DETAILED DESCRIPTION 7.1 Information Terms and Definitions

In this specification, "party" refers to any number of objects or entities that participate in a multiparty key exchange. A "party" may be a device such as a USB device or smartcard. A "party" may be any number of possible devices or computing environments, where private keys and public keys are generated, sent, received and computed. A "party" may be a computer node in an Internet infrastructure, a computer processor chip in a mobile phone, a computer acting as domain name server, a computer acting as a proxy, a computer chip in an embedded environment, a computer running a Linux operating system, a computer running Apple OS, a router. A "party" may refer to a computing environment operating inside a drone. A "party" may refer to a single quantum computer.

In this specification, "multiparty" refers to two or more parties. In some embodiments, "multiparty" may refer to four parties called Alice, Bob, Fred and Haley. In some embodiments, "multiparty" may refer to one thousand (i.e., 1,000) parties. In some embodiments, "multiparty" may refer to one million (i.e., 1,000,000) parties. In some embodiments, "multiparty" may refer to one billion (i.e., 1,000,000,000) parties. When there are a small number of participants in a multiparty key exchange, the human names Alice, Bob, Ella, Fred, Joanne and Kate are used even though each name may refer to one of the aforementioned devices or computing environments. When there is a multiparty exchange that involves a large number of participants, the symbols $P_1, P_2, \ldots, P_n$ may be used instead of human names. Thus, $P_1$ is a symbol that refers to the first party involved in a multiparty key exchange. $P_2$ is a symbol that refers to the second party involved in a multiparty key exchange. $P_3$ is a symbol that refers to the third party involved in a multiparty key exchange. $P_n$ is a symbol that refers to the nth party involved in a multiparty key exchange. In an embodiment, the number of distinct parties may be greater than one thousand so that n>1,000. In another embodiment, the number of distinct parties may be greater than one million so that n>1,000,000. In embodiments that have a smaller number of parties, the human names are often used. For example, in a 4-party exchange, the names Alice, Bob, Ella and Fred are used.

In this specification, the term "key" is a type of information and is a value or collection of values to which one or more operations are performed. In some embodiments, one or more of these operations are cryptographic operations. $\{0, 1\}^n$ is the set of all bit-strings of length n. When a public key is represented with bits, mathematically a n-bit key is an element of the collection $\{0, 1\}^n$ which is the collection of strings of 0's and 1's of length n. For example, the string of 0's and 1's that starts after this colon is a 128-bit key: 01100001 11000110 01010011 01110001 11000101 10001110 11011001 11010101 01011001 01100100 10110010 10101010 01101101 10000111 10101011 00010111. In an embodiment, n=3000 so that a key is a string of 3000 bits. In some embodiments, a public key is larger than 10 million bits.

In other embodiments, a public key may be a sequence of values that are not represented as bits. Consider the set {A, B, C, D, E}. For example, the string that starts after this colon is a 40-symbol key selected from the set {A, B, C, D, E}: ACDEB AADBC EAEBB AAECB ADDCB BDCCE ACECB EACAE. In an embodiment, a key could be a string of length n selected from $\{A, B, C, D, E\}^n$. In an embodiment, n=700 so that the key is a string of 700 symbols where each symbol is selected from {A, B, C, D, E}.

In this specification, the term "public key" refers to any kind of public key used in public key cryptography. In an embodiment, "public key" refers to an RSA public key. (For RSA, see reference [23] with Rivest as an author.) In an embodiment, "public key" refers to an elliptic curve public key. (See references [24, 25, 26] with authors Silverman, Edwards and Montgomery.) In an embodiment, "public key" refers to a McEliece public key. (See reference [21] with McEliece as an author.) In an embodiment, "public key" refers to a lattice-based public key.

In this specification, the term "size" of the key refers to the number of bits that represent the key. If a public key is represented in hexadecimal, then each symbol in {0, 1, 2, 3, 4, 5, 6, 7, 8, 9, A, B, C, D, E, F} has a size of 8 (eight) bits, and, for example, the size of F3 is sixteen (16 decimal) bits. The size of the hexadecimal public key F3 A2 34 79 03 BC C0 1E 16 39 7D 99 47 DF 28 54 is two hundred and fifty six (256 decimal) bits.

If n is the number of participants in a multiparty key exchange, then the function f(n)=3n is a linear function of the number of participants (number of parties) in a multiparty key exchange. If $k_1$ and $k_2$ are constants then function $f_{k_1,k_2}(n)=k_1 n+k_2$ is a linear function of n. The function g(n)=n log(n) increases faster than any linear function of n. The quadratic function $q(n)=n^2$ increases faster than any linear function. The function h(n)=log(n) increases slower than any linear function of n. The constant function c(n)=k, where k is a constant, does not increase at all. In this patent specification we will say that a constant function increases slower than any linear function. This is true of constant functions because they do not increase at all. In this patent specification, we are interested in the size of a multiparty public key as a function of the number of participants (number of parties) in the multiparty key exchange. In the prior art, the size of the public keys increases too much to support a multiparty key exchange between 1 billion different parties.

For example, in an embodiment, there are 1 billion sensors on our satellites circling the earth, and the sensors want to establish a shared secret. This is not possible with the prior art because the public key sizes become too big to support a multiparty key exchange with 1 billion participants. In an embodiment, a sensor is an antenna or contains an antenna. In an embodiment, a sensor is a microphone or contains a microphone. In an embodiment, a sensor is a speaker or contains a speaker. In an embodiment, a sensor is a camera or contains a camera. In an embodiment, a sensor is a video camera or contains a video camera. In an embodiment, a sensor is a light emitter or contains a light emitter. In an embodiment, a sensor is a Geiger counter or contains a Geiger counter. In an embodiment, a sensor is a gravity meter or contains a gravity meter. In an embodiment, a sensor is a barometer or contains a barometer. In an embodiment, a sensor can detect and measure pressure. In an embodiment, a sensor contains one or more chlorophyll molecules. In an embodiment, a sensor contains one or more mirrors. In an embodiment, a sensor contains one or more photodetectors.

In this specification, the term "multiparty" public key refers to a public key derived from two or more parties. In this specification, the term "multiparty" private key refers to a private key derived from two or more parties. In this specification, the term "multiparty" shared secret refers to a shared secret derived from two or more parties.

Figure 1A:
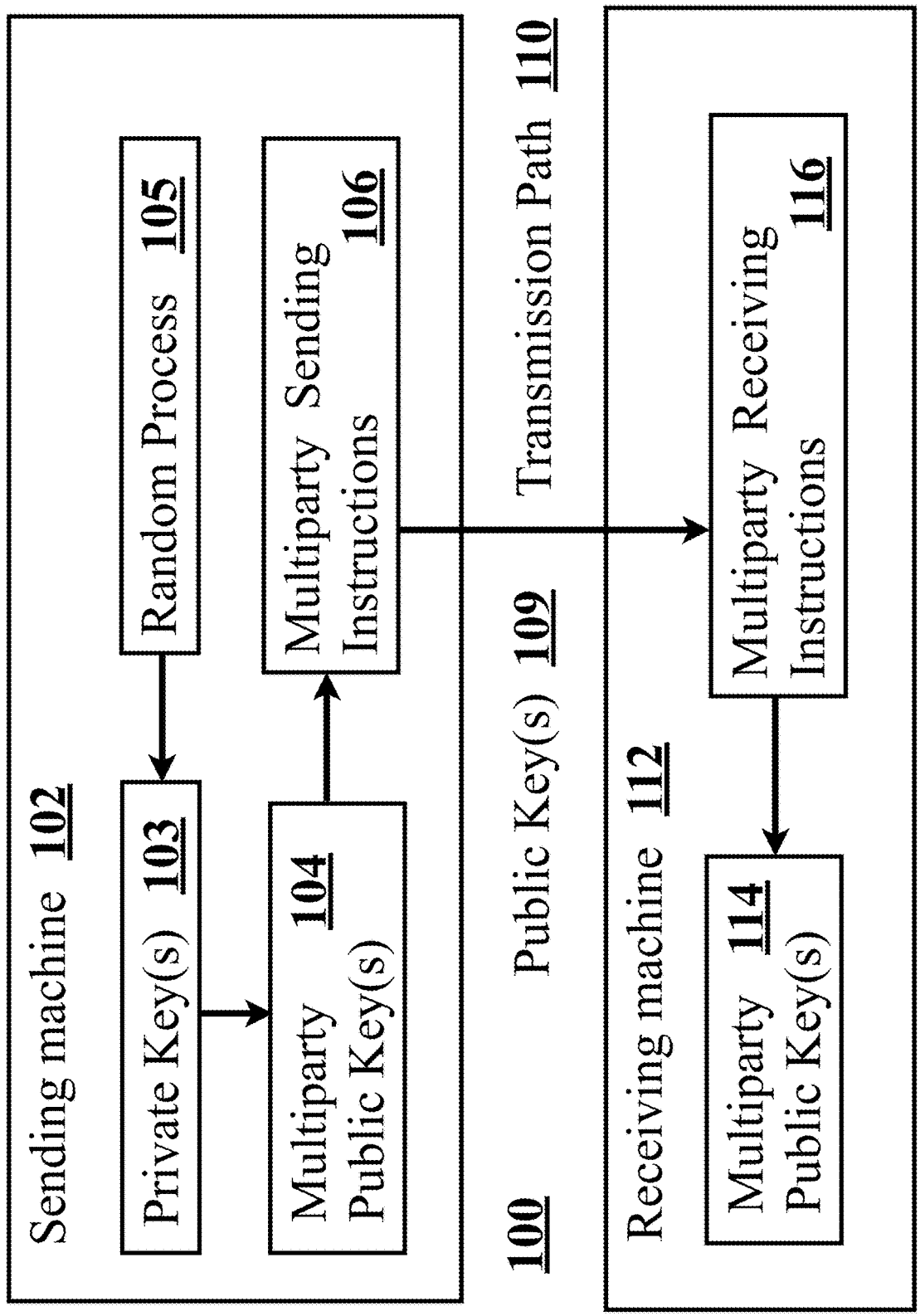
FIG. 1A shows an embodiment of an information system for sending, receiving multiparty public keys and computing a multiparty key exchange.
Figure 1B:
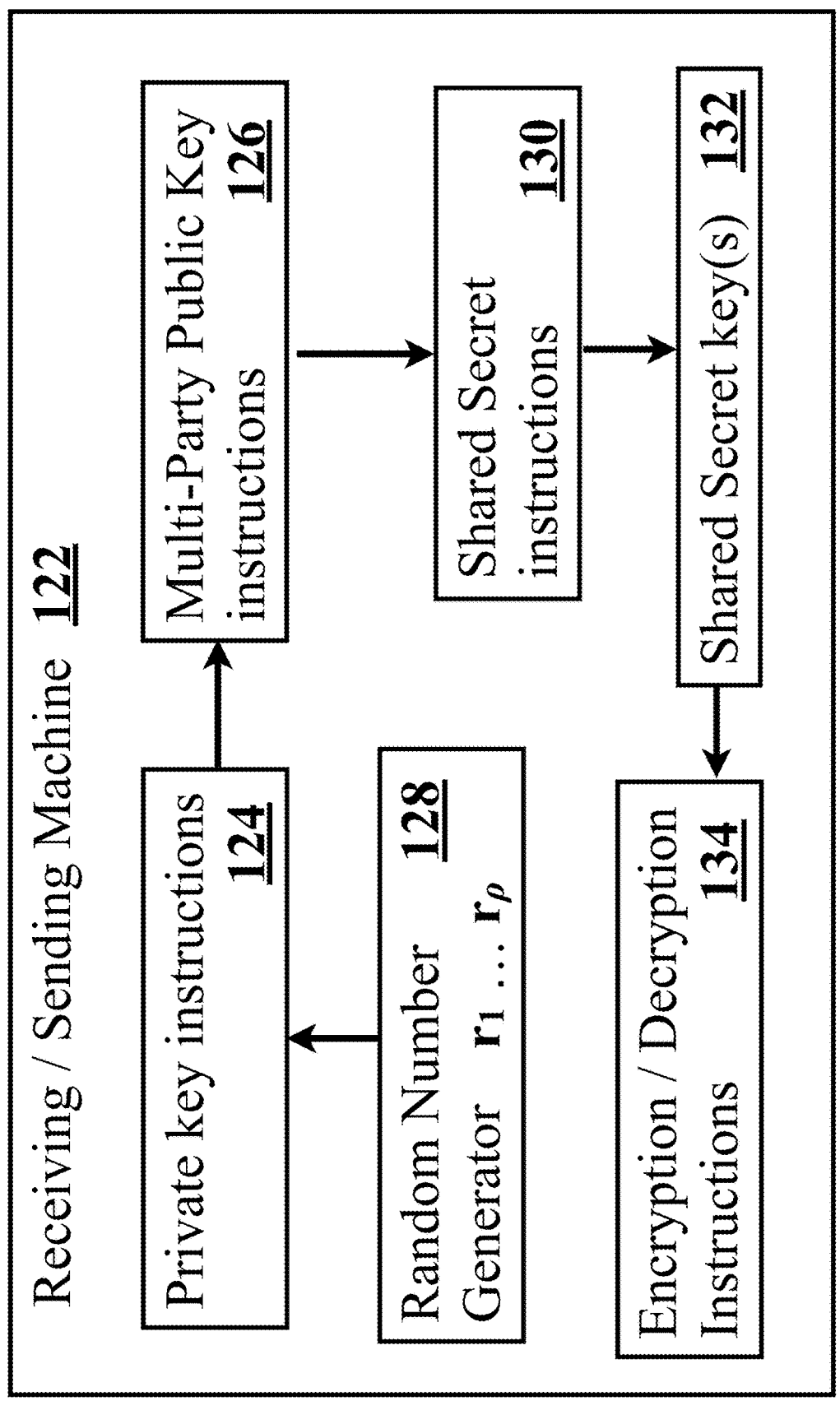
FIG. 1B shows an embodiment of a process for computing a multiparty key exchange that can be used in the embodiment of FIG. 1A.
Figure 2A:
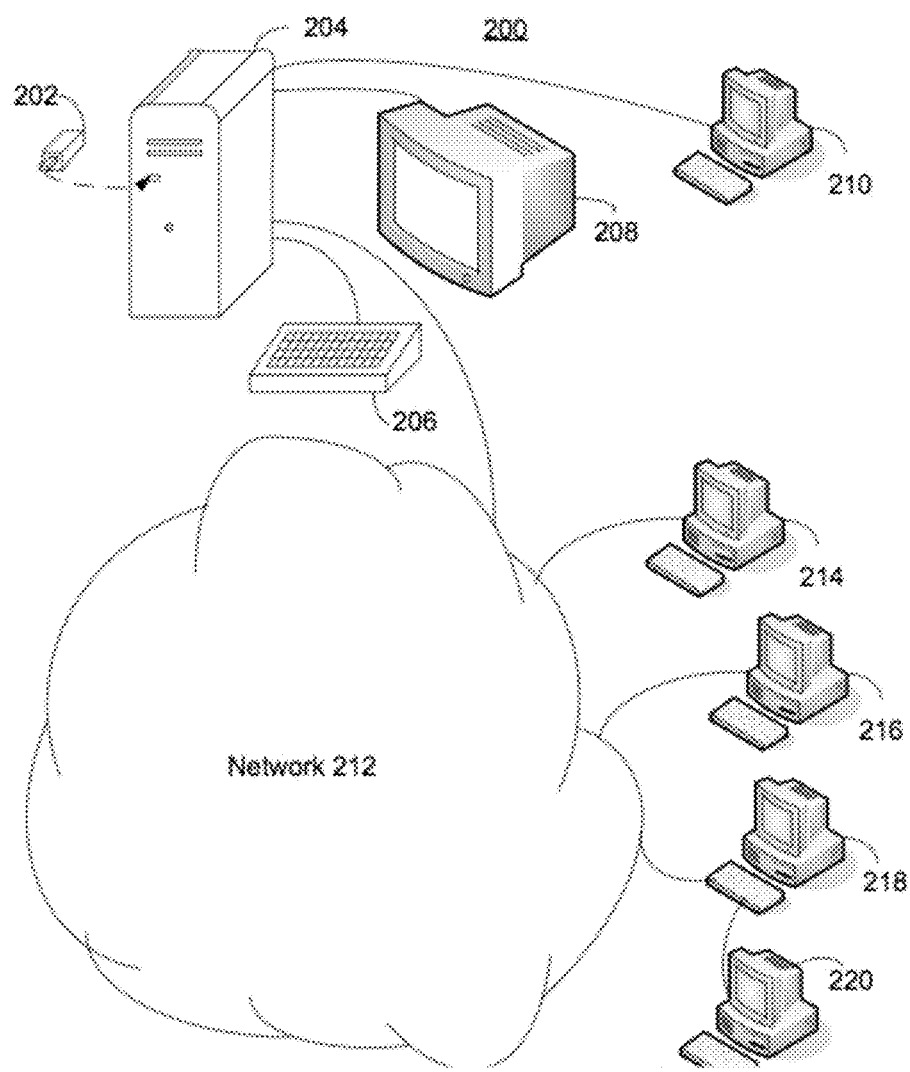
FIG. 2A shows an embodiment of a computer network transmitting multiparty public keys. In some embodiments, the transmission may be over the Internet or a part of a network that supports an infrastructure such as the electrical grid, a financial exchange, or a power plant, which can be used with the embodiment of FIG. 1A.
Figure 2B:
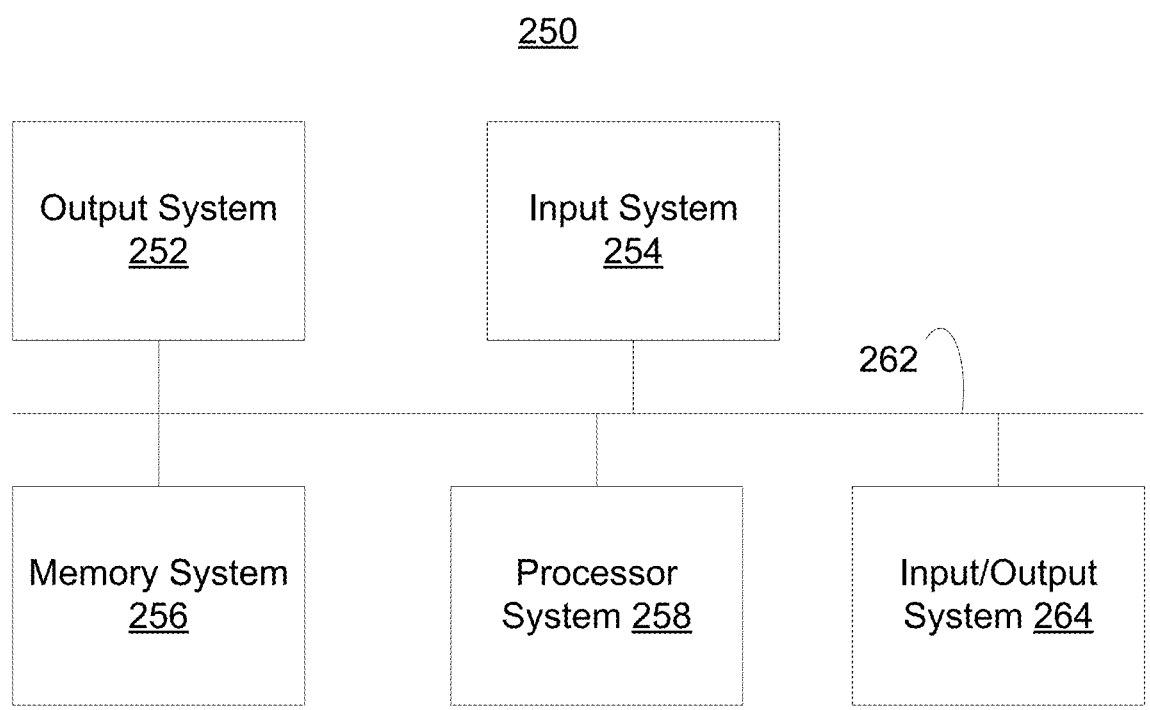
FIG. 2B shows an embodiment of a secure computing area for computing, sending and receiving multiparty keys, which includes a processor, memory and input/output system, which may be the sending and/or receiving machines of FIG. 1A.

In some embodiments, multiparty public key(s) 109 in FIG. 1A may be read as input by processor system 258 in FIG. 2B, that executes instructions which perform multiparty receiving instructions 116 in FIG. 1A. In some embodiments, multiparty public key(s) 132 in FIG. 1B, may be read as input by processor system 258, that executes instructions which perform multiparty receiving instructions 116.

In some embodiments, public key(s) 104 are RSA public key(s), which is a well-known public key cryptography [23]. RSA is described from the perspective of Alice. Alice chooses two huge primes $p_A$ and $q_A$. Alice computes $n_A=p_A q_A$ and a random number $r_A$ which has no common factor with $(p_A-1)(q_A-1)$. In other words, 1 is the greatest common divisor of $r_A$ and $(p_A-1)(q_A-1)$. he Euler-phi function is defined as follows. If k=1, then $\phi(k)=1$; if k>1, then $\phi(k)$ is the number positive integers i such that i<k and i and k are relatively prime. Relatively prime means the greatest common divisor of i and k is 1. The positive integer $e_A$ is randomly selected such that $e_A$ is relatively prime to $\phi(n_A)$.

Alice computes $\phi(n_A)=n_A+1-p_A-q_A$. Alice computes the multiplicative inverse of $r_A$ modulo $\phi(n_A)$; the multiplicative inverse is $d_A=e_A^{-1}$ modulo $\phi(n_A)$. Alice makes public her public key $(n_A, r_A)$: that is, the two positive integers $(n_A, r_A)$ are Alice's public key.

In an embodiment, random generator 128 generates $r_1 \ldots r_p$ which is input to private key instructions 124. In an embodiment that hides RSA public keys, private key instruction 124 use $r_1 \ldots r_p$ to find two huge primes $p_A$ and $q_A$ and a random number $r_A$ relatively prime to $(p_A-1)(q_A-1)$.

In an embodiment, random generator 128 and private key instructions 124 generate two huge primes $p_A$ and $q_A$; compute $n_A = p_A q_A$; and randomly choose $e_A$ that is relatively prime to $\phi(n_A)$. In an embodiment, private key instructions 124 compute $d_A = e_A^{-1}$ modulo $\phi(n_A)$. In an embodiment, an RSA private key is $(n_A, d_A)$. In an embodiment that hides RSA public keys, public key instructions 126 compute RSA public key $(n_A, r_A)$. In an embodiment, positive integer $n_A$ is a string of 4096 bits and $r_A$ is a string of 4096 bits.

In this specification, the term "location" may refer to geographic locations and/or storage locations. A particular storage location may be a collection of contiguous and/or noncontiguous locations on one or more machine readable media. Two different storage locations may refer to two different sets of locations on one or more machine-readable media in which the locations of one set may be intermingled with the locations of the other set.

In this specification, the term "machine-readable medium" refers to any non-transitory medium capable of carrying or conveying information that is readable by a machine. One example of a machine-readable medium is a computer-readable medium. Another example of a machine-readable medium is paper having holes that are detected that trigger different mechanical, electrical, and/or logic responses. The term machine-readable medium also includes media that carry information while the information is in transit from one location to another, such as copper wire and/or optical fiber and/or the atmosphere and/or outer space.

In this specification, the term "process" refers to a series of one or more operations. In an embodiment, "process" may also include operations or effects that are best described as non-deterministic. In an embodiment, "process" may include some operations that can be executed by a digital computer program and some physical effects that are non-deterministic, which cannot be executed by a digital computer program and cannot be performed by a finite sequence of processor instructions.

In this specification, the machine-implemented processes implement algorithms and non-deterministic processes on a machine. The formal notion of "algorithm" was introduced in Turing's work [4] and refers to a finite machine that executes a finite number of instructions with finite memory. In other words, an algorithm can be executed with a finite number of machine instructions on a processor. "Algorithm" is a deterministic process in the following sense: if the finite machine is completely known and the input to the machine is known, then the future behavior of the machine can be determined. In contrast, there is hardware that can measure quantum effects from photons (or other physically non-deterministic processes), whose physical process is non-deterministic. The recognition of non-determinism produced by quantum randomness and other quantum embodiments is based on decades of experimental evidence and statistical testing. Furthermore, the quantum theory—derived from the Kochen-Specker theorem and its extensions [2, 3]—predicts that the outcome of a quantum measurement cannot be known in advance and cannot be generated by a Turing machine (digital computer program). As a consequence, a physically non-deterministic process cannot be generated by an algorithm: namely, a sequence of operations executed by a digital computer program. FIG. 6A shows an embodiment of a non-deterministic process arising from quantum events; that is, the emission and absorption of photons.

Some examples of physically non-deterministic processes are as follows. In some embodiments that utilize non-determinism, photons strike a semitransparent mirror and can take two or more paths in space. In one embodiment, if the photon is reflected by the semitransparent mirror, then it takes on one bit value $b \in \{0, 1\}$; if the photon passes through by the semitransparent mirror, then the non-deterministic process produces another bit value $1-b$. In another embodiment, the spin of an electron may be sampled to generate the next non-deterministic bit. In still another embodiment, a protein, composed of amino acids, spanning a cell membrane or artificial membrane, that has two or more conformations can be used to detect non-determinism: the protein conformation sampled may be used to generate a non-deterministic value in $\{0, \ldots n-1\}$ where the protein has n distinct conformations. In an alternative embodiment, one or more rhodopsin proteins could be used to detect the arrival times of photons and the differences of arrival times could generate non-deterministic bits. In some embodiments, a Geiger counter may be used to sample non-determinism In this specification, the term "photodetector" refers to any type of device or physical object that detects or absorbs photons. A photodiode is an embodiment of a photodetector. A phototransistor is an embodiment of a photodetector. A rhodopsin protein is an embodiment of a photodetector.

7.2 Information System

FIG. 1A shows an information system 100 for executing a multiparty key exchange in a manner that is expected to be secure. Information system 100 includes one or more private keys 103 and one or more corresponding multiparty public keys 104, and multiparty sending instructions 106, a sending machine 102, multiparty public key(s) 109 and a transmission path 110, a receiving machine 112, multiparty receiving instructions 116, multiparty public key(s) 114. In other embodiments, information system 100 may not have all of the components listed above or may have other components instead of and/or in addition to those listed above.

Information system 100 may be a system for transmitting multiparty public key(s). Multiparty public key(s) 104 refers to information that is intended for a multiparty key exchange. In some embodiments, multiparty public key(s) 104 are intended to be delivered to another location, software unit, machine, person, or other entity.

In some embodiments, multiparty public key(s) 104 may serve as part of a multiparty key exchange. In an embodiment, multiparty public key(s) 104 may be transmitted wirelessly between satellites. Multiparty public key(s) 104 may be represented in analog form in some embodiments and may be represented in digital form. In an embodiment, the public key(s) may be one or more RSA public keys based on huge prime numbers. In an another embodiment, the public key(s) may be one or more elliptic curve public keys, computed from an elliptic curve over a finite field.

In information system 100, private keys 103 are used to help compute multiparty public key(s) 104. Multiparty public key(s) 104 may be a collection of multiple, blocks of information, an entire sequence of public keys, a segment of public keys, or any other portion of one or more public keys. When there is more than one public key, multiparty public keys 104 may be computed from distinct commutative groups, as described in section 7.10 For example, one commutative group may be based on an elliptic curve over a finite field; another commutative group may be based on multiplication modulo, as used in RSA; another commutative group may be based on Goppa codes; another commutative group may be based on lattices.

Multiparty sending instructions 106 may be a series of steps that are performed on multiparty public keys 104. In one embodiment, the term "process" refers to one or more instructions for sending machine 102 to execute the series of operations that may be stored on a machine-readable medium. Alternatively, the process may be carried out by and therefore refer to hardware (e.g., logic circuits) or may be a combination of instructions stored on a machine-readable medium and hardware that cause the operations to be executed by sending machine 102 or receiving machine 112. Public key(s) 104 may be input for multiparty sending instructions 106. The steps that are included in multiparty sending instructions 106 may include one or more mathematical operations and/or one or more other operations.

As a post-processing step, one-way hash function 648 may be applied to a sequence of random events such as quantum events (non-deterministic) generated by non-deterministic generator 642 in FIG. 6A. As a post-processing step, one-way hash function 648 may be applied to a sequence of random events such as quantum events (non-deterministic) generated by non-deterministic generator 652 in FIG. 6B.

In FIG. 1B receiving/sending machine 122 may implement multiparty sending instructions 106 in FIG. 1A. In some embodiments, random number generator 128 help generate randomness that is used by private key instructions 130. In some embodiments, receiving/sending machine 122 requests random number generator 128 and private key instructions 124 to help generate one or more private keys 103 that are used to compute public keys 104. In an embodiment, non-deterministic generator 642 (FIG. 6A) may be part of random generator 128. In an embodiment, non-deterministic generator 652 (FIG. 6B) may be part of random generator 128.

Sending machine 102 may be an information machine that handles information at or is associated with a first location, software unit, machine, person, sender, or other entity. Sending machine 102 may be a computer, a phone, a mobile phone, a telegraph, a satellite, or another type of electronic device, a mechanical device, or other kind of machine that sends information. Sending machine 102 may include one or more processors and/or may include specialized circuitry for handling information. Sending machine 102 may receive public key(s) 104 from another source (e.g., a transducer such as a microphone which is inside mobile phone 402 or 502 of FIG. 4), may produce all or part of public key(s) 104, may implement multiparty sending instructions 106, and/or may transmit the output to another entity. In another embodiment, sending machine 102 receives public key(s) 104 from another source, while multiparty sending instructions 106 and the delivery of the output of multiparty sending instructions 106 are implemented manually. In another embodiment, sending machine 102 implements multiparty sending instructions 106, having multiparty public key(s) 104 entered, via a keyboard (for example) or via a mobile phone microphone, into sending machine 102. In another embodiments, sending machine 102 receives output from multiparty sending instructions 106 and sends the output to another entity.

Sending machine 102 may implement any of the multiparty key exchange methods described in this specification. In some embodiments, receiving/sending machine 122, shown in FIG. 1B, generates one or more private keys 103 from private key instructions 124 and random generator 128; computes one or more multiparty public keys 104 with multiparty public key instructions 126.

Transmission path 110 is the path taken by multiparty public key(s) 109 to reach the destination to which multiparty public key(s) 109 were sent. Transmission path 110 may include one or more networks, as shown in FIG. 2A. In FIG. 2A, network 212 may help support transmission path 110. For example, transmission path 110 may be the Internet, which is implemented by network 212; for example, transmission path 110 may be wireless using voice over Internet protocol, which is implemented by network 212. Transmission path 110 may include any combination of any of a direct connection, hand delivery, vocal delivery, one or more Local Area Networks (LANs), one or more Wide Area Networks (WANs), one or more phone networks, including paths under the ground via fiber optics cables and/or one or more wireless networks, and/or wireless inside and/or outside the earth's atmosphere.

Receiving machine 112 may be an information machine that handles information at the destination of an multiparty public key(s) 109. Receiving machine 112 may be a computer, a phone, a telegraph, a router, a satellite, or another type of electronic device, a mechanical device, or other kind of machine that receives information. Receiving machine 112 may include one or more processors and/or specialized circuitry conFlG.d for handling information, such as multiparty public key(s) 109. Receiving machine 112 may receive multiparty public key(s) 109 from another source and/or reconstitute all or part of multiparty public key(s) 109. Receiving machine 112 may implement any of the multiparty key exchange methods described in this specification and is capable of receiving any multiparty public keys from sending machine 102 and multiparty sending instructions 106.

In one embodiment, receiving machine 112 only receives public keys 109 from transmission path 110, while multiparty sending instructions 106 is implemented manually and/or by another information machine. In another embodiment, receiving machine 112 implements multiparty receiving instructions 116 that reproduces all or part of public key(s) 104, referred to as multiparty public key(s) 114 in FIG. 1A. In another embodiment, receiving machine 112 receives multiparty public key(s) 109 from transmission path 110, and reconstitutes all or part of multiparty public key(s) 114 using multiparty receiving instructions 116. Multiparty receiving instructions 116 may store or process any of the multiparty public keys described in this specification.

Receiving machine 112 may be identical to sending machine 102. For example, receiving machine 112 may receive 104 from another source, produce all or part of multiparty public key(s) 104, and/or implement multiparty sending instructions 106. Similar to sending machine 102, receiving machine 112 may create random private keys and compute unpredictable multiparty public key(s). Receiving machine 112 may transmit the output of multiparty receiving instructions 116, via transmission path 110 to another entity and/or receive multiparty public key(s) 109 (via transmission path 110) from another entity. Receiving machine 112 may present public key(s) 109 for use as input to multiparty receiving instructions 116.

7.3 Processor, Memory and Input/Output Hardware

Figure 3A:
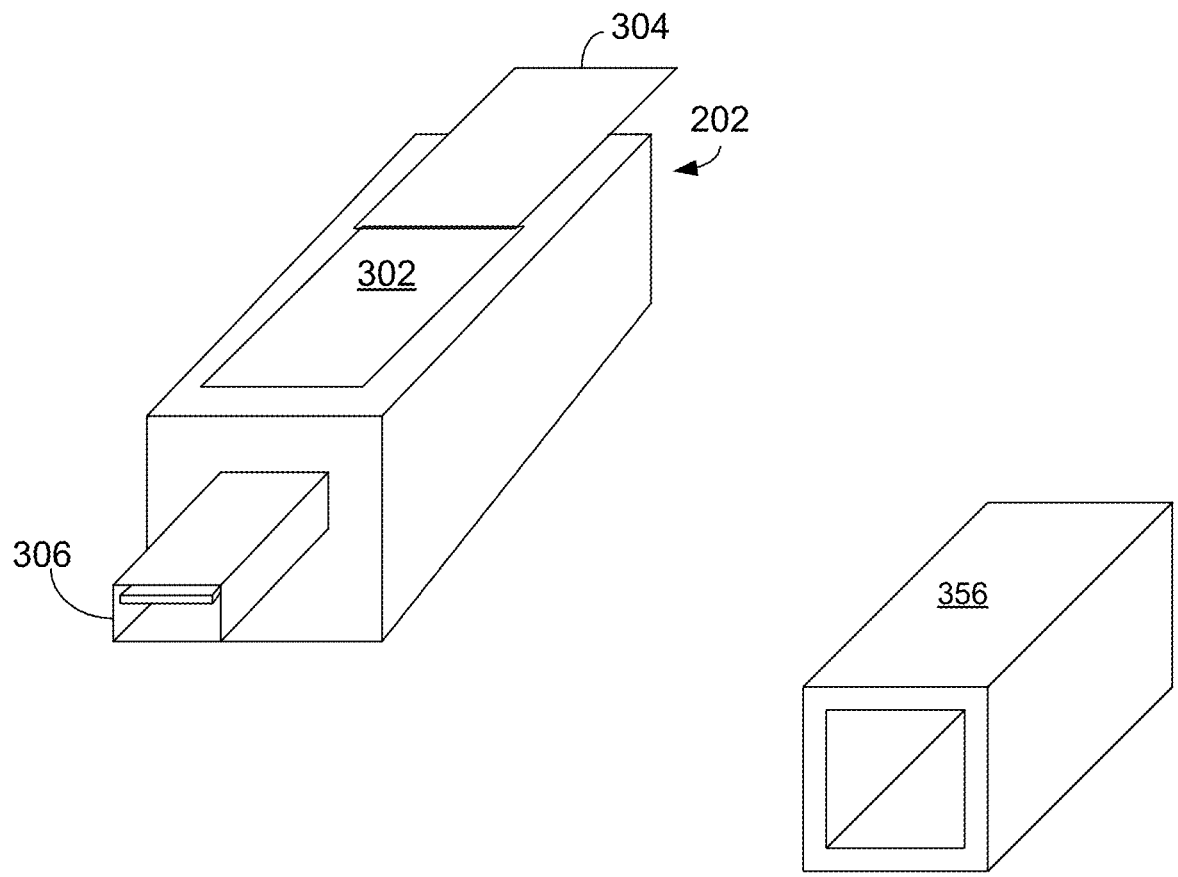
FIG. 3A shows an embodiment of a USB drive that can act as a sending machine and receiving machine to store and protect a user's information.
Figure 3B:
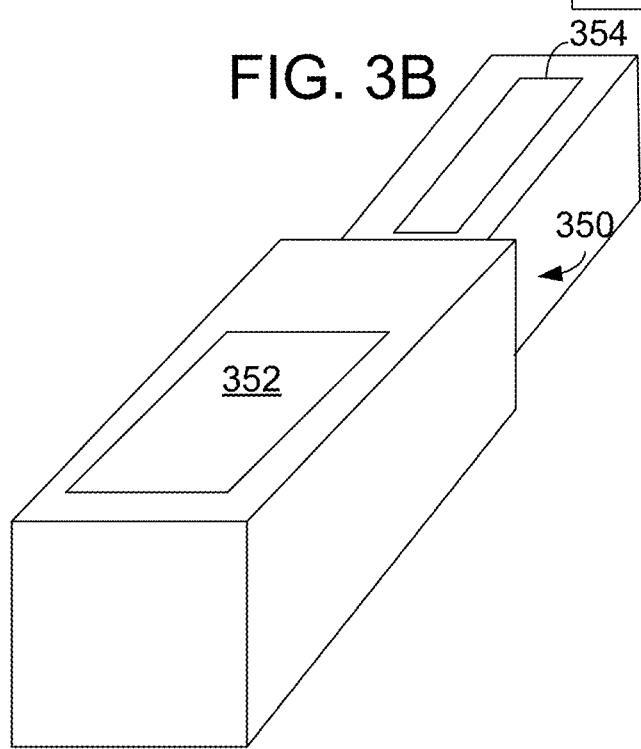
FIG. 3B shows an embodiment of an authentication token, which may include the sending and/or receiving machines of FIG. 1A, that contains a computer processor that can compute multiparty keys.

Information system 200 illustrates some of the variations of the manners of implementing information system 100. Sending machine 202 is one embodiment of sending machine 101. Sending machine 202 may be a secure USB memory storage device as shown in 3A. Sending machine 202 may be an authentication token as shown in FIG. 3B. A mobile phone embodiment of sending machine 202 is shown in FIG. 4.

Sending machine 202 or sending machine 400 may communicate wirelessly with computer 204. In an embodiment, computer 204 may be a call station for receiving multiparty public key 109 from sending machine 400. A user may use input system 254 and output system 252 of sending machine (mobile phone) 400 to transmit multiparty public key to a receiving machine that is a mobile phone. In an embodiment, input system 254 in FIG. 2B includes a microphone that is integrated with sending machine (mobile phone) 400. In an embodiment, output system 252 in FIG. 2B includes a speaker that is integrated with sending machine (mobile phone) 400. In another embodiment, sending machine 202 is capable of being plugged into and communicating with computer 204 or with other systems via computer 204.

Computer 204 is connected to system 210, and is connected, via network 212, to system 214, system 216, and system 218, which is connected to system 220. Network 212 may be any one or any combination of one or more Local Area Networks (LANs), Wide Area Networks (WANs), wireless networks, telephones networks, and/or other networks. System 218 may be directly connected to system 220 or connected via a LAN to system 220. Network 212 and system 214, 216, 218, and 220 may represent Internet servers or nodes that route multiparty public key(s) 109 received from sending machine 400 shown in FIG. 4. In FIG. 2A, system 214, 216, 218, and system 220 and network 212 may together serve as a transmission path 110 for multiparty public key(s) 109. In an embodiment, system 214, 216, 218, and system 220 and network 212 may execute the Internet protocol stack in order to serve as transmission path 110 for multiparty public key 109. In an embodiment, multiparty public key(s) 109 may be one or more public keys computed from elliptic curve computations over a finite field. In an embodiment, multiparty public key(s) 109 may be one or more public keys computed using algebraic coding theory such as McEliece public key cryptography. In an embodiment, multiparty public key 109 may sent via TCP/IP or UDP. In an embodiment, multiparty public key 109 may be sent by email. In an embodiment, multiparty public key 109 may be represented as ASCII text sent from sending machine 400.

In FIG. 1B, receiving/sending machine 122 may be implemented by any of, a part of any of, or any combination of any of system 210, network 212, system 214, system 216, system 218, and/or system 220. As an example, routing information of transmission path 110 may be sent with receiving/sending machine 122 that executes in system computer 210, network computers 212, system computer 214, system computer 216, system computer 218, and/or system computer 220. multiparty sending instructions 106 may be executed inside sending machine 400 and multiparty receiving instructions 116 may be executed inside receiving machine 400 in FIG. 4.

In an embodiment, multiparty sending instructions 106 and multiparty receiving instructions 116 execute in a secure area of processor system 258 of FIG. 2B. In an embodiment, specialized hardware in processor system 258 may be implemented to speed up the computation of shared secret instructions 130 in FIG. 1B. In an embodiment, this specialized hardware in processor system 258 may be embodied as an ASIC (application specific integrated circuit) that computes SHA-1 and/or SHA-512 and/or Keccak and/or BLAKE and/or JH and/or Skein that help execute one-way hash function 648 in non-deterministic generator 642 or one-way hash function 658 in non-deterministic generator 652.

In an embodiment, specialized hardware in processor system 258 may be embodied as an ASIC (application specific integrated circuit) that computes SHA-1 and/or SHA-512 and/or Keccak and/or BLAKE and/or JH and/or Skein that help execute the HMAC function in processes ▯ and ▯. An ASIC chip can increase the execution speed and protect the privacy of multiparty sending instructions 106 and multiparty receiving instructions 116.

In an embodiment, input system 254 of FIG. 2B receives public key(s) 104 and processor system 258 computes them with receiving/sending machine 122. Output system 252 sends the multiparty public key(s) 109 to a telecommunication network 212. In an embodiment, memory system 256 stores private key instructions 124, public key instructions 126 and shared secret instructions 130.

In an embodiment, memory system 256 of FIG. 2B stores shared secret key(s) 132. In an embodiment, memory system 256 stores multiparty public key(s) 109 that is waiting to be sent to output system 252 and sent out along transmission path 110, routed and served by system computers 210, 214, 216, 218 and 220 and network 212.

7.4 Non-Deterministic Generators

FIG. 6A shows an embodiment of a non-deterministic generator 642 arising from quantum events: that is, random number generator 128 uses the emission and absorption of photons for its non-determinism. In FIG. 6A, phototransistor 644 absorbs photons emitted from light emitting diode 654. In an embodiment, the photons are produced by a light emitting diode 646. In FIG. 6B, non-deterministic generator 652 has a photodiode 654 that absorbs photons emitted from light emitting diode 656. In an embodiment, the photons are produced by a light emitting diode 656.

FIG. 7 shows a light emitting diode (LED) 702. In an embodiment, LED 702 emits photons and is part of the non-deterministic generator 642 (FIG. 6A). In an embodiment, LED 702 emits photons and is part of the non-deterministic generator 652 (FIG. 6B). LED 702 contains a cathode, a diode, an anode, one terminal pin connected to the cathode and one terminal pin connected to the anode, a p-layer of semiconductor, an active region, an n-layer of semiconductor, a substrate and a transparent plastic case. The plastic case is transparent so that a photodetector outside the LED case can detect the arrival times of photons emitted by the LED. In an embodiment, photodiode 644 absorbs photons emitted by LED 702. In an embodiment, phototransistor 654 absorbs photons emitted by LED 702.

The emission times of the photons emitted by the LED experimentally obey the energy-time form of the Heisenberg uncertainty principle. The energy-time form of the Heisenberg uncertainty principle contributes to the non-determinism of random number generator 128 because the photon emission times are unpredictable due to the uncertainty principle. In FIG. 6A and FIG. 6B, the arrival of photons are indicated by a squiggly curve with an arrow and hv next to the curve. The detection of arrival times of photons is a non-deterministic process. Due to the uncertainty of photon emission, the arrival times of photons are quantum events.

In FIG. 6A and FIG. 6B, hv refers to the energy of a photon that arrives at photodiode 644, respectively, where h is Planck's constant and ν is the frequency of the photon. In FIG. 6A, the p and n semiconductor layers are a part of a phototransistor 644, which generates and amplifies electrical current, when the light that is absorbed by the phototransistor. In FIG. 6B, the p and n semiconductor layers are a part of a photodiode 654, which absorbs photons that strike the photodiode.

A photodiode is a semiconductor device that converts light (photons) into electrical current, which is called a photocurrent. The photocurrent is generated when photons are absorbed in the photodiode. Photodiodes are similar to standard semiconductor diodes except that they may be either exposed or packaged with a window or optical fiber connection to allow light (photons) to reach the sensitive part of the device. A photodiode may use a PIN junction or a p-n junction to generate electrical current from the absorption of photons. In some embodiments, the photodiode may be a phototransistor.

A phototransistor is a semiconductor device comprised of three electrodes that are part of a bipolar junction transistor. Light or ultraviolet light activates this bipolar junction transistor. Illumination of the base generates carriers which supply the base signal while the base electrode is left floating. The emitter junction constitutes a diode, and transistor action amplifies the incident light inducing a signal current.

When one or more photons with high enough energy strikes the photodiode, it creates an electron-hole pair. This phenomena is a type of photoelectric effect. If the absorption occurs in the junction's depletion region, or one diffusion length away from the depletion region, these carriers (electron-hole pair) are attracted from the PIN or p-n junction by the built-in electric field of the depletion region. The electric field causes holes to move toward the anode, and electrons to move toward the cathode; the movement of the holes and electrons creates a photocurrent. In some embodiments, the amount of photocurrent is an analog value, which can be digitized by a analog-to-digital converter. In some embodiments, the analog value is amplified before being digitized. The digitized value is what becomes the random number. In some embodiments, a one-way hash function 648 or 658 may also be applied to post-process the raw random bits to produce private keys used by processes ▒ and ▒. In some embodiments, a one-way hash function may be applied using one-way hash instructions 664 to the random digitized output of non-deterministic generator 642 before executing private key(s) instructions 124, used by processes ▒ and ▒.

In an embodiment, the sampling of the digitized photocurrent values may converted to threshold times as follows. A photocurrent threshold $\theta$ is selected as a sampling parameter. If a digitized photocurrent value $i_1$ is above $\theta$ at time $t_1$, then $t_1$ is recorded as a threshold time. If the next digitized photocurrent value $i_2$ above $\theta$ occurs at time $t_2$, then $t_2$ is recorded as the next threshold time. If the next digitized value $i_3$ above $\theta$ occurs at time $t_3$, then $t_3$ is recorded as the next threshold time.

After three consecutive threshold times are recorded, these three times can determine a bit value as follows. If $t_2-t_1 > t_3-t_2$, then non-deterministic generator 642 or 652 produces a 1 bit. If $t_2-t_1 < t_3-t_2$, then non-deterministic generator 642 or 652 produces a 0 bit. If $t_2-t_1 = t_3-t_2$, then no random bits are produced. To generate the next bit, non-deterministic generator 642 or 652 continues the same sampling steps as before and three new threshold times are produced and compared.

In an alternative sampling method, a sample mean $\mu$ is established for the photocurrent, when it is illuminated with photons. In some embodiments, the sampling method is implemented as follows. Let $i_1$ be the photocurrent value sampled at the first sampling time. $i_1$ is compared to $\mu$. $\epsilon$ is selected as a parameter in the sampling method that is much smaller number than $\mu$. If $i_1$ is greater than $\mu+\epsilon$, then a 1 bit is produced by the non-deterministic generator 642 or 652. If $i_1$ is less than $\mu-\epsilon$, then a 0 bit is produced by non-deterministic generator 642 or 652. If $i_1$ is in the interval $[\mu-\epsilon, \mu+\epsilon]$, then NO bit is produced by non-deterministic generator 642 or 652.

Let $i_2$ be the photocurrent value sampled at the next sampling time. $i_2$ is compared to $\mu$. If $i_2$ is greater than $\mu+\epsilon$, then a 1 bit is produced by the non-deterministic generator 642 or 652. If $i_2$ is less than $\mu-\epsilon$, then a 0 bit is produced by the non-deterministic generator 642 or 652. If $i_2$ is in the interval $[\mu-\epsilon, \mu+\epsilon]$, then NO bit is produced by the non-deterministic generator 642 or 652. This alternative sampling method continues in the same way with photocurrent values $i_3$, $i_4$, and so on. In some embodiments, the parameter $\epsilon$ is selected as zero instead of a small positive number relative to $\mu$.

Some alternative hardware embodiments of random number generator 128 (FIG. 1B) are described below. In some embodiments that utilize non-determinism to produce randomness, a semitransparent mirror may be used. In some embodiments, the mirror contains quartz (glass). The photons that hit the mirror may take two or more paths in space. In one embodiment, if the photon is reflected, then the random number generator creates the bit value $b \in \{0, 1\}$; if the photon is transmitted, then the random number generator creates the other bit value 1−b. In another embodiment, the spin of an electron may be sampled to generate the next non-deterministic bit. In still another embodiment of a random number generator, a protein, composed of amino acids, spanning a cell membrane or artificial membrane, that has two or more conformations can be used to detect non-determinism: the protein conformation sampled may be used to generate a random number value in $\{0, \ldots n-1\}$ where the protein has n distinct conformations. In an alternative embodiment, one or more rhodopsin proteins could be used to detect the arrival times $t_1 < t_2 < t_3$ of photons and the differences of arrival times ($t_2-t_1 > t_3-t_2$ versus $t_2-t_1 < t_3-t_2$) could generate non-deterministic bits that produce a random number.

In some embodiments, the seek time of a hard drive can be used as non-deterministic generator as the air turbulence in the hard drive affects the seek time in a non-deterministic manner. In some embodiments, local atmospheric noise can be used as a source of randomness. For example, the air pressure, the humidity or the wind direction could be used. In other embodiments, the local sampling of smells based on particular molecules could also be used as a source of randomness.

In some embodiments, a Geiger counter may be used to sample non-determinism and generate randomness. In these embodiments, the unpredictability is due to radioactive decay rather than photon emission, arrivals and detection.

7.5 One-Way Hash Functions

In FIG. 6A, one-way hash function 648 may include one or more one-way functions. A one-way hash function $\Phi$, has the property that given an output value z, it is computationally intractable to find an information element $m_z$ such that $\Phi(m_z)=z$. In other words, a one-way function $\Phi$ is a function that can be easily computed, but that its inverse $\Phi^{-1}$ is computationally intractable to compute [6]. A computation that takes $10^{101}$ computational steps is considered to have computational intractability of $10^{101}$.

More details are provided on computationally intractable. In an embodiment, there is an amount of time T that encrypted information must stay secret. If encrypted information has no economic value or strategic value after time T, then computationally intractable means that the number of computational steps required by all the world's computing power will take more time to compute than time T. Let C(t) denote all the world's computing power at the time t in years.

Consider an online bank transaction that encrypts the transaction details of that transaction. Then in most embodiments, the number of computational steps that can be computed by all the world's computers for the next 30 years is in many embodiments likely to be computationally intractable as that particular bank account is likely to no longer exist in 30 years or have a very different authentication interface.

To make the numbers more concrete, the 2013 Chinese supercomputer that broke the world's computational speed record computes about 33,000 trillion calculations per second [7]. If T=1 one year and we can assume that there are at most 1 billion of these supercomputers. (This can be inferred from economic considerations, based on a far too low 1 million dollar price for each supercomputer. Then these 1 billion supercomputers would cost 1,000 trillion dollars.). Thus, $C(2014) \times 1$ year is less than $10^9 \times 33 \times 10^{15} \times 3600 \times 24 \times 365 = 1.04 \times 10^{33}$ computational steps.

As just discussed, in some embodiments and applications, computationally intractable may be measured in terms of how much the encrypted information is worth in economic value and what is the current cost of the computing power needed to decrypt that encrypted information. In other embodiments, economic computational intractability may be useless. For example, suppose a family wishes to keep their child's whereabouts unknown to violent kidnappers. Suppose T=100 years because it is about twice their expected lifetimes. Then 100 years×C(2064) is a better measure of computationally intractible for this application. In other words, for critical applications that are beyond an economic value, one should strive for a good estimate of the world's computing power.

One-way functions that exhibit completeness and a good avalanche effect or the strict avalanche criterion [8] are preferable embodiments: these properties are favorable for one-way hash functions. The definition of completeness and a good avalanche effect are quoted directly from [8]

If a cryptographic transformation is complete, then each ciphertext bit must depend on all of the plaintext bits. Thus, if it were possible to find the simplest Boolean expression for each ciphertext bit in terms of plaintext bits, each of those expressions would have to contain all of the plaintext bits if the function was complete. Alternatively, if there is at least one pair of n-bit plaintext vectors X and $X_i$ that differ only in bit i, and f(X) and $f(X_i)$ differ at least in bit j for all $\{(i, j): 1 \leq i, j \leq n\}$, the function f must be complete.

For a given transformation to exhibit the avalanche effect, an average of one half of the output bits should change whenever a single input bit is complemented. In order to determine whether a m×n (m input bits and n output bits) function f satisfies this requirement, the $2^m$ plaintext vectors must be divided into $2^{m-1}$ pairs, X and $X_j$ such that X and $X_j$ differ only in bit i. Then the $2^{m-1}$ exclusive-or sums $V_i = f(X) \oplus f(X_i)$ must be calculated. These exclusive-or sums will be referred to as avalanche vectors, each of which contains n bits, or avalanche variables.

If this procedure is repeated for all i such that $1 \leq i \leq m$ and one half of the avalanche variables are equal to 1 for each i, then the function f has a good avalanche effect. Of course this method can be pursued only if m is fairly small; otherwise, the number of plaintext vectors becomes too large. If that is the case then the best that can be done is to take a random sample of plaintext vectors X, and for each value i calculate all avalanche vectors V. If approximately one half the resulting avalanche variables are equal to 1 for values of i, then we can conclude that the function has a good avalanche effect.

A hash function, also denoted as $\Phi$, is a function that accepts as its input argument an arbitrarily long string of bits (or bytes) and produces a fixed-size output of information. The information in the output is typically called a message digest or digital fingerprint. In other words, a hash function maps a variable length m of input information to a fixed-sized output, $\Phi(m)$, which is the message digest or information digest. Typical output sizes range from 160 to 512 bits, but can also be larger. An ideal hash function is a function $\Phi$, whose output is uniformly distributed in the following way: Suppose the output size of $\Phi$ is n bits. If the message m is chosen randomly, then for each of the $2^n$ possible outputs z, the probability that $\Phi(m)=z$ is $2^{-n}$. In an embodiment, the hash functions that are used are one-way.

A good one-way hash function is also collision resistant. A collision occurs when two distinct information elements are mapped by the one-way hash function $\Phi$ to the same digest. Collision resistant means it is computationally intractable for an adversary to find collisions: more precisely, it is computationally intractable to find two distinct information elements $m_1, m_2$ where $m_1 \neq m_2$ and such that $\Phi(m_1)=\Phi(m_2)$.

A number of one-way hash functions may be used to implement one-way hash function 148. In an embodiment, SHA-512 can implement one-way hash function 148, designed by the NSA and standardized by NIST [15]. The message digest size of SHA-512 is 512 bits. Other alternative hash functions are of the type that conform with the standard SHA-384, which produces a message digest size of 384 bits. SHA-1 has a message digest size of 160 bits. An embodiment of a one-way hash function 148 is Keccak [10]. An embodiment of a one-way hash function 148 is BLAKE [11]. An embodiment of a one-way hash function 148 is Grøstl [12] An embodiment of a one-way hash function 148 is JH [13]. Another embodiment of a one-way hash function is Skein [14].

7.6 Algebraic Groups

In this section, some terms and definitions about algebraic groups are described that are relevant to various embodiments, including the mathematical operations applied and/or computed in these embodiments. It is helpful to review the mathematical definition of a group. A group G is a set with a binary operation * such that the following four properties hold:

I. Binary operation * is closed on G. This means a*b lies in G for all elements a and b in G.
II. Binary operation * is associative. That is, a*(b*c)=(a*b)*c for all elements a, b, and c in G.
III. There is a unique identity element e in G, where a*e=e*a=a.
IV. Each element a in G has a unique inverse denoted as $a^{-1}$. This means $a*a^{-1}=a^{-1}*a=e$.

Group G is a commutative group when a*b=b*a for every pair of elements a and b selected from G. The product g*g is denoted as $g^2$; g*g*g*g*g is denoted as $g^5$. Sometimes, the binary operation * will be omitted so that a*b is expressed as ab.

The integers $\{\ldots, -2, -1, 0, 1, 2, \ldots\}$ with respect to the binary operation + (integer addition) are an example of an infinite commutative group. It is commutative because m+n=n+m for any two integers m and n. 0 is the identity element. For example, the inverse of 5 is −5 and the inverse of −107 is 107.

The set of permutations on n elements $\{1, 2, \ldots, n\}$, denoted as $S_n$, is an example of a finite group with n! elements where the binary operation is function composition. Each element of $S_n$ is a function $p:\{1, 2, \ldots, n\} \to \{1, 2, \ldots, n\}$ that is 1 to 1 and onto. In this context, p is called a permutation. The identity permutation e is the identity element in $S_n$, where e(k)=k for each k in $\{1, 2, \ldots, n\}$.

If H is a non-empty subset of a group G and H is a group with respect to the binary group operation * of G, then H is called a subgroup of G. H is a proper subgroup of G if H is not equal to G (i.e., H is a proper subset of G). G is a cyclic group if G has no proper subgroups.

Define $A_n=\mathbb{Z}_n-[0]=\{[1], \ldots, [n-1]\}$; in other words, $A_n$ is the integers modulo n with equivalence class [0] removed. If n=5, [4]*[4]=[16 mod 5]=[1] in ($\mathbb{Z}_5$, *) Similarly, [3]*[4]=[12 mod 5]=[2] in ($\mathbb{Z}_5$, *). Let (a, n) represent the greatest common divisor of a and n. Let $U_n=\{[a] \in A_n:(a, n)=1\}$. Define binary operator on $U_n$ as [a]*[b]=[ab], where ab is the multiplication of positive integers a and b. Then ($U_n$, *) is a finite, commutative group.

Suppose g lies in group (G, *). This multiplicative notation works as follows: $g^2=g*g$. Also $g^3=g*g*g$; $g^6=g*g*g*g*g*g$ and so on. In section 7.10 this multiplicative notation (superscripts) is used in the description of multiparty key exchanges.

There are an infinite number of finite groups and an infinite number of these groups are huge. The notion of huge means the following: if $2^{1024}$ is considered to be a huge number based on the computing power of current computers, then there are still an infinite number of finite, commutative groups with each group containing more than $2^{1024}$ elements.

7.7 Elliptic Curve Group Operations

For elliptic curves [24] the mathematical operations—derived from the Weierstrauss curve—are as follows:
1. Select two geometric points $p_1$, $p_2$ on the Weierstrauss curve.
2. Draw a line through these two points $p_1$ and $p_2$.
3. Compute the new intersection point of the line with the Weierstrauss curve.
4. Reflects this new intersection point about the y axis, resulting in the point $p_{new}=p_1*p_2$
5. The new point $p_{new}$ is the result of the mathematical operations on points $p_1$ and $p_2$.

In the special case, when the two points are the same point (i.e., $p_1=p_2$), the mathematical operations consist of the following. A tangent line to the Weierstrauss curve at $p_1$ is computed. Then a new intersection point with the tangent line and the Weierstrauss curve is computed. Then a reflection is applied to this new intersection point, resulting in $p_{new}$.

In another embodiment, elliptic curve computations are performed on an Edwards curve over a finite field. When the field K does not have characteristic two, an Edwards curve is of the form: $x^2+y^2=1+dx^2y^2$, where d is an element of the field K not equal to 0 and not equal to 1. For an Edwards curve of this form, the binary operator * is defined as $$(x_1, y_1) * (x_2, y_2) = \left(\frac{x_1y_2 + x_2y_1}{1 + dx_1x_2y_1y_2}, \frac{y_1y_2 - x_1x_2}{1 - dx_1x_2y_1y_2}\right),$$

where the elements of the group are the points $(x_1, y_1)$ and $(x_2, y_2)$. The definition of * defines elliptic curve computations that form a commutative group. For more information on Edwards curves, refer to the math journal paper [25].

In an alternative embodiment, elliptic curve computations are performed on a Montgomery curve over a finite field. Let K be the finite field over which the elliptic curve is defined. A Montgomery curve is of the form $By^2=x^3+Ax^2+x$, for some field elements A, B chosen from K where $B(A^2-4)\neq 0$. For more information on Montgomery curves, refer to the publication [26].

7.8 Goppa Code Operations

Goppa codes are covered in Chapter 8 of reference [20]. This section summarizes how Goppa codes and the mathematical operations described below can used in a public-key cryptosystem, conceived by McEliece [21]. As of this time, this McEliece public-key cryptosystem is considered resistant to known quantum computing algorithms.

Corresponding to each irreducible polynomial of degree t over $GF(2^m)$, there exists a binary irreducible Goppa code of length $n=2^m$, such that the Goppa code's dimension $k \geq n-tm$. Furthermore, this Goppa code is capable of correcting any pattern with t or fewer errors. Moreover, there exists a fast algorithm for decoding these Goppa codes: the run time is O(nt). This fast algorithm is called Patterson's algorithm. See problem 8.18 in reference [20].

Suppose that the information system chooses a large enough value of n and t, and then randomly selects an irreducible polynomial of degree t over $GF(2^m)$. The value $$\frac{1}{t}$$

is close to the probability that a randomly selected polynomial of degree t is irreducible. There is a fast algorithm for testing irreducibility, shown in chapter 6 of reference [17]. Next, the information system (Alice) computes a k×n generator matrix G for the code which is canonical, for example, row-reduced echelon form.

After generating G, Alice's information system scrambles G by randomly selecting a dense k×k nonsingular matrix S and randomly selecting an n×n permutation matrix P. Next, Alice's information system computes G'=S*G*P, where * represents matrix multiplication. The result G' generates a linear code with the same rate and minimum distance as the code generated by G. Matrix G' is called the public generator matrix and acts as Alice's public key.

Alice transmits her public key G' to Bob. Bob is able to encrypt his plaintext data using the following encryption algorithm, along with Alice's public key G'.

McEliece Encryption Algorithm.
1. Bob divides the plaintext data into k-bit blocks.
2. Suppose u is a plaintext block that Bob wishes to securely send to Alice. Bob computes the vector x=u*G'+z, where G' is a public generator matrix, and z is a randomly generated random vector of length n and weight t. Bob keeps z local.
3. Bob transmits encrypted data x to Alice.

Alice can efficiently recover u by performing the following decryption algorithm.

McEliece Decryption Algorithm.
1. Alice computes x'=x*P$^{-1}$, where P$^{-1}$ is the inverse of permutation matrix P.
2. x' is a codeword for the Goppa code previously chosen. Alice executes Patterson's algorithm to help compute u'=u*S
3. Alice recovers u by computing u=u'*S$^{-1}$, where S$^{-1}$ is the inverse matrix of the nonsingular matrix S, randomly selected by her information system.

7.9 Lattice Operations

This section describes lattices and how public keys can be computed from mathematical operations based on lattices. In some embodiments, the binary operation of vector addition on a lattice makes the lattice into a commutative group. The symbol $\mathbb{R}$ represents the real numbers. The symbol $\mathbb{Z}$ represents the integers.

Let L be subset of points of the vector space $\mathbb{R}^n$ that contains the origin (0, 0, ..., 0). Then the set L is a lattice if it satisfies the following two conditions.
1. L is a group with vector addition as its binary operation.
2. There exists an r>0, such that for each point x in L, the open ball with center x and radius r contains no other points of L besides x.

It is well-known [22] that if L is a lattice in an n-space (n-dimensional vector space) then there exists k linearly independent vectors $v_1, v_2 \ldots v_k$ with k≤n such that L consists of all points of the form $$m_1 v_1 + m_2 v_2 + \ldots + m_k v_k$$

where each $m_i$ is an integer.

Let $\mathbb{Z}_q^{m \times n}$ be the set of all n rows of m tuples of integers modulo q. The following math operations make up a public cryptographic system, called LWE (i.e., Learning with Errors) based on lattices. The errors are assigned according to the noise distribution $\chi$ such that $$\|e\| \leq \frac{q}{4m}$$

with high probability.

LWE Key-Pair Generation.
1. n is the input parameter for Alice.
2. A in $\mathbb{Z}_q^{m \times n}$ is randomly selected by Alice and is open to the public. A is an n×m matrix with entries in $\mathbb{Z}_q$, selected according to a uniform distribution.
3. Alice selects e in $\mathbb{Z}_q^m$, according to a uniform distribution.
4. Alice's secret s is randomly selected in $\mathbb{Z}_q^n$, according to a uniform distribution.
5. Alice's key pair is (p, s), with public key p=(A, s$^T$*A+e$^T$). Note s$^T$*A is vector s$^T$ multiplied by matrix A. Expression s$^T$ is the transpose of vector s. Expression e$^T$ is the transpose of vector e.

LWE Encryption with the Public Key.
1. Bob receives as input Alice's public key (A, b$^T$) and plaintext message m in {0, 1}.
2. Bob randomly samples m-bit vector r in $\{0, 1\}^m$ and computes ciphertext $$(A*r, b^T*r + m\lceil \tfrac{q}{2} \rceil).$$

7.10 Multiparty Key Exchange

Multiparty Process 1. A 4-Party Key Exchange

Step 1. Alice, Bob, Haley and Fred agree on a common generator g in commutative group (G, *).
Alice, Bob, Haley and Fred agree on a shared secret transformation function $\Gamma$.
Shared secret transformation function $\Gamma$ maps a shared secret to a multiparty private key.

Step 2. Alice generates her private key a.
Bob generates his private key b.
Haley generates her private key h.
Fred generates his private key f.

Step 3. Haley uses commutative group operation * to compute her public key $g^h$ from her private key h and generator g.
Alice computes her public key $g^a$ from her private key a.
Bob computes his public key $g^b$ from his private key b.
Fred computes his public key $g^f$ from his private key f.

Step 4. Fred sends his public key $g^f$ to Haley.
Bob sends his public key $g^b$ to Alice.
Alice sends her public key $g^a$ to Bob.
Haley sends her public key $g^h$ to Fred.

Step 5. Bob receives Alice's public key $g^a$.
Haley receives Fred's public key $g^f$.
Fred receives Haley's public key $g^h$.
Alice receives Bob's public key $g^b$.

Step 6. Fred computes shared secret $g^{hf}$ with private key f and Haley's public key.
Alice computes shared secret $g^{ba}$ with private key a and Bob's public key.
Haley computes shared secret $g^{fh}$ with private key h and Fred's public key.
Bob computes shared secret $g^{ab}$ with private key b and Bob's public key.

Step 7. Bob transforms his shared secret $g^{ab}$ to multiparty private key $\alpha_b = \Gamma(g^{ab})$.
Fred transforms his shared secret $g^{hf}$ to multiparty private key $\eta_f = \Gamma(g^{hf})$.
Alice transforms her shared secret $g^{ba}$ to multiparty private key $\beta_a = \Gamma(g^{ba})$.
Haley transforms her shared secret $g^{fh}$ to multiparty private key $\varepsilon_h = \Gamma(g^{fh})$.

Step 8. Bob computes his multiparty public key $g^{\alpha_b}$ from his multiparty private key $\alpha_b$.
Haley computes her multiparty public key $g^{\varepsilon_h}$ from her multiparty private key $\varepsilon_h$.
Alice computes her multiparty public key $g^{\beta_a}$ from her multiparty private key $\beta_a$.
Fred computes his multiparty public key $g^{\eta_f}$ from his multiparty private key $\eta_f$.

Step 9. Bob sends his multiparty public key $g^{\alpha_b}$ to Haley.
Haley sends her multiparty public key $g^{\varepsilon_h}$ to Alice.
Alice sends her multiparty public key $g^{\beta_a}$ to Fred.
Fred sends his multiparty public key $g^{\eta_f}$ to Bob.

Step 10. Fred uses his multiparty private key and multiparty public key $g^{\beta_a}$ to compute 4-party shared secret $g^{\beta_a \eta_f}$.
Alice uses her multiparty private key and multiparty public key $g^{\varepsilon_h}$ to compute 4-party shared secret $g^{\varepsilon_h \beta_a}$.
Haley uses her multiparty private key and multiparty public key $g^{\alpha_b}$ to compute 4-party shared secret $g^{\alpha_b \varepsilon_h}$.
Bob uses his multiparty private key and and multiparty public key $g^{\eta_f}$ to compute 4-party shared secret $g^{\eta_f \alpha_b}$.

In an embodiment, $\Gamma$ is a Turing computable function. Because $\Gamma$ is a function, Bob's multiparty private key $\alpha_b = \Gamma(g^{ab})$ equals Alice's multiparty private key $\beta_a = \Gamma(g^{ba})$. Similarly, Haley's multiparty private key $\varepsilon_h = \Gamma(g^{fh})$ equals Fred's multiparty private key $\eta_f = \Gamma(g^{hf})$. Because the multiparty private keys satisfy $\alpha_b=\beta_a$ and $\varepsilon_h=\eta_f$ and G is a commutative group, the resulting 4 shared secrets are equal: $g^{\beta_a\eta_f}=g^{\varepsilon_h\beta_a}=g^{\alpha_b\varepsilon_h}=g^{\eta_f\alpha_b}$.

FIG. 5A shows step 4 of multiparty process 1.

FIG. 5B shows step 9 of multiparty process 1. In an embodiment of step 9, Bob sends multiparty public key $g^{\alpha_b}$ with sending machine 102 over transmission path 110 and Haley receives multiparty public key $g^{\alpha_b}$ with receiving machine 112. In an embodiment, transmission path 110 uses network 212 (FIG. 2A) that is part of the Internet to route multiparty public key $g^{\alpha_b}$ to Haley.

In an embodiment of step 9, Haley sends multiparty public key $g^{\varepsilon_h}$ with sending machine 102 over transmission path 110 and Alice receives multiparty public key $g^{\varepsilon_h}$ with receiving machine 112. In an embodiment, transmission path 110 uses network 212 (FIG. 2A) that is part of the Internet to route multiparty public key $g^{\varepsilon_h}$ to Alice.

In an embodiment of step 9, Alice sends multiparty public key $g^{\beta_a}$ with sending machine 102 over transmission path 110 and Fred receives multiparty public key $g^{\beta_a}$ with receiving machine 112. In an embodiment, transmission path 110 uses network 212 that is part of the Internet to route multiparty public key $g^{\beta_a}$ to Fred.

In an embodiment of step 9, Fred sends multiparty public key $g^{\eta_f}$ with sending machine 102 over transmission path 110 and Bob receives multiparty public key $g^{\eta_f}$ with receiving machine 112. In an embodiment, transmission path 110 uses network 212 that is part of the Internet to route multiparty public key $g^{\eta_f}$ to Bob.

In an embodiment, shared secret transformation function $\Gamma$, executed in private key instructions 124, is implemented with a MAC (e.g., HMAC [9] or [16]) or one-way hash function and then a projection function. The projection function assures that the resulting multiparty private key has the appropriate number of bits with respect to group (G, *).

In an embodiment of multiparty process 1, Alice, Bob, Haley and Fred's steps are performed in receiving/sending machine 122. In an embodiment, each of Alice, Bob, Fred and Haley's non-deterministic generators 642 (FIG. 6a) generate input to private key instructions 124, which create private keys a, b, f, h, respectively. In an embodiment, deterministic generator 642 is an instance of random number generator 128 in FIG. 1B. In some embodiments, the private keys a, b, f, h are each randomly selected from the positive integers $\{1, 2, 3, \ldots, o(g)-1\}$ based on generator g and the output from each party's non-deterministic generators 642.

In an embodiment of multiparty process 1, Alice's shared secret instructions 130 (FIG. 1B) compute shared secret $g^{ba}$ by computing $g^b* \ldots *g^b$ with the group operation * in G. In other words, Bob's public key $g^b$ is multiplied to itself a times. Then Alice's private key instructions 124 compute Alice's multiparty party private key $\beta_a=\Gamma(g^{ba})$ Afterward, Alice's multiparty public key instructions 126 compute $g^{\beta_a}=g* \ldots *g$, where g is multiplied by itself $\beta_a$ times.

In an embodiment of multiparty process 1, Bob's shared secret instructions 130 (FIG. 1B) compute shared secret $g^{ab}$ by computing $g^a* \ldots *g^a$ with the group operation * in G. In other words, Alice's public key $g^a$ is multiplied to itself b times. Then Bob's private key instructions 124 compute Bob's multiparty party private key $\alpha_b=\Gamma(g^{ab})$ Afterward, Bob's multiparty public key instructions 126 compute $g^{\alpha_b}=g* \ldots *g$, where g is multiplied by itself $\alpha_b$ times.

In an embodiment of multiparty process 1, Fred's shared secret instructions 130 (FIG. 1B) compute shared secret $g^{hf}$ by computing $g^{h}* \ldots *g^{h}$; in other words, Haley's public key $g^h$ is multiplied to itself f times. Then Fred's private key instructions 124 compute Fred's multiparty party private key $\eta_f=\Gamma(g^{hf})$ Afterward, Fred's multiparty public key instructions 126 compute $g^{\eta_f}=g* \ldots *g$, where g is multiplied to itself $\eta_f$ times.

In an embodiment of multiparty process 1, Haley's shared secret instructions 130 (FIG. 1B) compute shared secret $g^{fh}$ by computing $g^{f}* \ldots *g^{f}$; in other words, Fred's public key $g^f$ is multiplied to itself h times. Then Haley's private key instructions 124 compute Haley's multiparty party private key $\varepsilon_h=\Gamma(g^{fh})$ Afterward, Haley's multiparty public key instructions 126 compute $g^{\varepsilon_h}=g* \ldots *g$, where g is multiplied to itself $\varepsilon_h$ times.

In an embodiment of multiparty process 1, Alice, Bob, Haley and Fred's steps are performed in receiving machine 112 by multiparty receiving instructions 116. In an embodiment of multiparty process 1, Alice, Bob, Haley and Fred's steps are performed in sending machine 102 by multiparty sending instructions 116.

In some embodiments of multiparty process 1, private key instructions 124, multiparty public key instructions 126 and shared secret instructions 130 execute elliptic curve computations over a finite field; in other words, (G, *) is an elliptic curve group. In other embodiments of process private key instructions 124, multiparty public key instructions 126 and shared secret instructions 130 are computed with RSA cryptography. In some embodiments, private key instructions 124, multiparty public key instructions 126 and shared secret instructions 130 compute McEliece cryptography [21] based on Goppa codes [20].

Multiparty Process 2. A n-Party Key Exchange

Step 1. n parties $P_1, P_2, \ldots, P_n$ agree on generator g in commutative group (G, *).

Parties $P_1, P_2, \ldots, P_n$ agree on a shared secret transformation function $\Gamma$.

Shared secret transformation function $\Gamma$ maps a shared secret to a multiparty private key.

Step 2. Party $P_1$ generates her private key $a_1$.

Party $P_2$ generates her private key $a_2$.

. . .

Party $P_n$ generates her private key $a_n$.

Step 3. Party $P_1$ uses commutative group operation * to compute her public key $g^{a_1}$ from her private key $a_1$ and generator g.

Party $P_2$ computes her public key $g^{a_2}$ from her private key $a_2$.

. . .

Party $P_n$ computes her public key $g^{a_n}$ from her private key $a_n$.

Step 4. Party $P_1$ sends her public key $g^{a_1}$ to party $P_2$.

Party $P_2$ sends her public key $g^{a_2}$ to party $P_1$.

Party $P_3$ sends her public key $g^{a_3}$ to party $P_4$.

Party $P_4$ sends her public key $g^{a_4}$ to party $P_3$.

. . .

Party $P_{n-1}$ sends her public key $g^{a_{n-1}}$ to party $P_n$.

Party $P_n$ sends her public key $g^{a_n}$ to party $P_{n-1}$.

Step 5. Party $P_1$ receives $P_2$'s public key $g^{a_2}$.

Party $P_2$ receives $P_1$'s public key $g^{a_1}$.

Party $P_3$ receives $P_4$'s public key $g^{a_4}$.

Party $P_4$ receives $P_3$'s public key $g^{a_3}$.

. . .

Party $P_{n-1}$ receives $P_n$'s public key $g^{a_n}$.
Party $P_n$ receives $P_{n-1}$'s public key $g^{a_{n-1}}$.

Step 6. Party $P_1$ private key $a_1$ and public key $g^{a_2}$ compute shared secret $g^{a_2 a_1}$.

Party $P_2$ private key $a_2$ and public key $g^{a_1}$ compute shared secret $g^{a_1 a_2}$.

Party $P_3$ private key $a_3$ and public key $g^{a_4}$ compute shared secret $g^{a_4 a_3}$.

Party $P_4$ private key $a_4$ and public key $g^{a_3}$ compute shared secret $g^{a_3 a_4}$.

. . .

Party $P_{n-1}$'s private key $a_{n-1}$ and public key $g^{a_n}$ compute shared secret $g^{a_n a_{n-1}}$.

Party $P_n$'s private key $a_n$ and public key $g^{a_{n-1}}$ compute shared secret $g^{a_{n-1} a_n}$.

Step 7. Party $P_1$ maps her shared secret $g^{a_2 a_1}$ to multiparty private key $\alpha_{1,2} = \Gamma(g^{a_2 a_1})$.

Party $P_2$ maps her shared secret $g^{a_1 a_2}$ to multiparty private key $\alpha_{2,1} = \Gamma(g^{a_1 a_2})$.

. . .

Party $P_{n-1}$ maps shared secret $g^{a_n a_{n-1}}$ to multiparty private key $\alpha_{n,n-1} = \Gamma(g^{a_n a_{n-1}})$.

Party $P_n$ maps shared secret $g^{a_{n-1} a_n}$ to multiparty private key $\alpha_{n-1,n} = \Gamma(g^{a_{n-1} a_n})$.

Step 8. Party $P_1$ computes her multiparty public key $g^{\alpha_{1,2}}$ from her multiparty private key $\alpha_{1,2}$.

Party $P_2$ computes her multiparty public key $g^{\alpha_{2,1}}$ from her multiparty private key $\alpha_{2,1}$.

. . .

Party $P_{n-1}$ computes multiparty public key $g^{\alpha_{n-1,n}}$ from her multiparty private key $\alpha_{1,2}$.

Party $P_n$ computes multiparty public key $g^{\alpha_{n,n-1}}$ from her multiparty private key $\alpha_{2,1}$.

Step 9. Party $P_1$ sends her multiparty public key $g^{\alpha_{1,2}}$ to party $P_3$.

Party $P_2$ sends her multiparty public key $g^{\alpha_{2,1}}$ to party $P_4$.
Party $P_3$ sends her multiparty public key $g^{\alpha_{3,4}}$ to party $P_1$.
Party $P_4$ sends her multiparty public key $g^{\alpha_{4,3}}$ to party $P_2$.

. . .

Party $P_{n-1}$ sends her multiparty public key $g^{\alpha_{n-1,n}}$ to party $P_{n-3}$.

Party $P_n$ sends her multiparty public key $g^{\alpha_{n,n-1}}$ to party $P_{n-2}$.

Step 10. Party $P_1$ uses her multiparty private key and multiparty public key $g^{\alpha_{3,4}}$ to compute multiparty shared secret $g^{\alpha_{3,4} \alpha_{1,2}}$.

. . .

Party $P_n$ uses her multiparty private key and multiparty public key $g^{\alpha_{n-3,n-2}}$ to compute multiparty shared secret $g^{\alpha_{n-3,n-2} \alpha_{n,n-1}}$.

Remaining Steps Repeat $[\log_2(n)]$ times the following: a sequence of steps similar steps 7 to 10. The final result establishes a shared secret $\alpha_{1,2,\ldots,n}$ between parties $P_1, P_2, \ldots, P_n$.

The expression [x] is the smallest integer greater than x. For example, [51/10]=6. The n-party exchange description assumes the number of parties n is even. When n is odd, the multiparty exchange is similar.

In embodiments of multiparty processes ▨ and ▨, generator g is an element of a commutative group (G, *) with a huge order. In some embodiments, G is a cyclic group and the number of elements in G is a prime number. In an embodiment, generator g has an order $o(g) > 10^{80}$. In another embodiment, generator g has an order $o(g)$ greater than $10^{1000}$.

In an embodiment of multiparty process ▨, party $P_i$'s non-deterministic generator 642 produces input for private key instructions 124 which compute private key $a_i$. In an embodiment, party $P_i$'s multiparty public key instructions 126 compute her public key as $g^{a_i} = g * \ldots * g$ where g is multiplied by itself $a_i$ times, using the group operations in (G, *). In some embodiments, the party $P_i$'s private key $a_i$ is randomly selected from the positive integers $\{1, 2, 3, \ldots, o(g)-1\}$. In an embodiment of multiparty process ▨, party $P_i$'s steps are performed in receiving machine 112. In an embodiment of multiparty process ▨, party $P_i$'s steps are performed in sending machine 102.

In some embodiments of multiparty process ▨, private key instructions 124, multiparty public key instructions 126 and shared secret instructions 130 execute elliptic curve computations over a finite field; in other words, (G, *) is an elliptic curve group. In other embodiments of multiparty process private key instructions 124, multiparty public key instructions 126 and shared secret instructions 130 are computed with RSA cryptography. In some embodiments, private key instructions 124, multiparty public key instructions 126 and shared secret instructions 130 compute McEliece cryptography [21], based on Goppa codes [20].

In some embodiments of multiparty process ▨, party $P_1$ instructions are executed inside of machine 210, as shown in FIG. 2A; party $P_2$'s instructions are executed inside of machine 214, as shown in FIG. 2A; party $P_3$'s instructions are executed inside of machine 216. In some embodiments, machines 210, 214, 216, 218 execute instructions in system 250, as shown in FIG. 2B, that contains output system 252, input system 254, memory system 256, and processor system 258. In some embodiments of multiparty process ▨ parties $P_1, P_2, \ldots P_n$ transmit their public keys across network 212, as shown in FIG. 2A.

7.11 Secure Conference Call

In an embodiment of multiparty process ▨ or ▨ three or more parties make a voice or video conference call so that any outsiders may not listen or eavesdrop on their voice conversation. Encryption/decryption instructions 134 encrypt video and voice data before it is transmitted between the conference call parties. In an embodiment, encryption/decryption instructions are executed inside of mobile phone 400 and mobile phone 500, as shown in FIG. 4.

In an embodiment, shared secret key(s) 132 stores the shared secret $\alpha_{1,2,\ldots,n}$ established between parties $P_1, P_2, \ldots, P_n$. In an embodiment, as shown in FIG. 4, mobile phone 400 acts as party $P_1$ and mobile phone 500 acts as party $P_2$. Transformation function $\Gamma$ maps $\alpha_{1,2,\ldots,n}$ to a shared symmetric cryptographic key and a shared authentication key among parties $P_1, P_2, \ldots, P_n$. Using encryption/decryption instructions 134, parties $P_1, P_2, \ldots, P_n$ encrypt each party's voice and video data with the symmetric cryptographic key before sending it to the other parties via transmission path 110.

7.12 Secure Self-Driving Vehicles

In some embodiments of multiparty process ▨ a multiparty key exchange can help protect a network of autonomous self-driving automobiles, trucks or flying vehicles. As shown in FIG. 8, each vehicle performs process ▨ and transmits multiparty public keys to other self-driving vehicles and vice versa to establish one or more shared secrets between all valid self-driving vehicles. In some embodiments, the shared secret(s) established by the valid self-driving vehicles helps prevent a rogue vehicle or rogue communication from an unauthorized vehicle or unauthorized person, or unauthorized computer from subverting the communication or driving directions of the self-driving vehicles. This can help prevent catastrophic events such as two self-driving vehicles crashing due to subverted communications and/or a self-driving vehicle hitting one or more pedestrians. In some instances, an unauthorized computer may attempt to transmit malware that is installed as a software update, such that the malware subverts the driving instructions executed by processor system 258 (FIG. 2B), located inside vehicle 510.

In an embodiment, shared secret key(s) 132 stores the shared secret(s) $\alpha_{1,2,\ldots,n}$ established between parties $P_1$, $P_2, \ldots, P_n$. Transformation function $\Gamma$ maps $\alpha_{1,2,\ldots,n}$ to a shared symmetric cryptographic key and a shared authentication key among parties $P_1, P_2, \ldots, P_n$. Using encryption/decryption instructions 134, parties $P_1, P_2, \ldots, P_n$ encrypt each vehicle's data and communications with the symmetric cryptographic key and sign the data and communications with the authentication key before sending them to the other self-driving vehicles via transmission path 110. FIG. 8 shows parties $P_1, P_2, \ldots, P_n$, represented as vehicles 1, 2, ..., n-1, n.

Although the invention(s) have been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

REFERENCES

[1] Dan Boneh, Craig Gentry and Brent Waters. Collusion Resistant Broadcast Encryption With Short Ciphertexts and Private Keys.

[2] Simon Kochen and Ernst P. Specker. The Problem of Hidden Variables in Quantum Mechanics. Journal of Mathematics and Mechanics (now Indiana Univ. Math Journal) 17 No. 1, 59-87, 1967.

[3] John Conway and Simon Kochen. The Strong Free Will Theorem. Notices of the American Mathematical Society. 56(2), 226-232, February 2009.

[4] Alan M. Turing. On computable numbers, with an application to the Entscheidungsproblem. Proc. London Math. Soc. Series 2 42 (Parts 3 and 4), 230-265, 1936. A correction, ibid. 43, 544-546, 1937.

[5] Wikipedia. Transmission Control Protocol/Internet Protocol.
https://en.m.wikipedia.org/wiki/TCP_IP

[6] Stephen Cook. The P VS NP Problem.
http://www.claymath.org/
sites/default/files/pvsnp.pdf

[7] Klint Finley. Chinese Supercomputer Is Still the World's Most Powerful. Wired Magazine. Nov. 18, 2013.

[8] A. F. Webster and S. E. Tavares. On the Design of S-Boxes. Advances in Cryptology. CRYPTO 85 Proceedings. LNCS 218. Springer, 523-534, 1986.

[9] Mihir Bellare, Ran Canetti and Hugo Krawczyk. Keying Hash Functions for Message Authentication. Advances in Cryptology—Crypto 96 Proceedings. LNCS 1109, N. Koblitz ed., Springer, 1996.

[10] Guido Bertoni, Joan Daemen, Michael Peeters, Gilles Van Assche. Keccak Reference 3.0 2011.
http://keccak.noekeon.org/
http://en.wikipedia.org/wiki/Keccak

[11] Jean-Philippe Aumasson, Samuel Neves, Zooko Wilcox-O'Hearn, Christian Winnerlein. BLAKE.
https://131002.net/blake/

[12] Praveen Gauravaram, Lars Knudsen, Krystian Matusiewicz, Florian Mendel, Christian Rechberger, Martin Schläffer, and Soren S. Thomsen. Grostl—a SHA-3 candidate. http://www.groestl.info

[13] Hongjun Wu. The Hash Function JH. 2011.
http://ehash.iaik.tugraz.at/wiki/JH
http://www3.ntu.edu.sg/home
/wuhj/research/jh/jh_round3.pdf

[14] Niels Ferguson, Stefan Lucks, Bruce Schneier, Doug Whiting, Mihir Bellare, Tadayoshi Kohno, Jon Callas, Jesse Walker. The Skein Hash Function Family. 2010.
https://www.schneier.com/skein1.3.pdf
http://en.wikipedia.org/
wiki/Skein_(hash_function)

[15] NIST. FIPS-180-2: Secure Hash Standard, August 2002. http://www.itl.nist.gov/fipspubs/.

[16] Mark Wegman and J. Lawrence Carter. New Hash Functions and Their Use in Authentication and Set Equality. Journal of Computer and System Sciences. 22, 265-279, 1981.

[17] E. R. Berlekamp. Algebraic Coding Theory. New York, McGraw-Hill, 1968.

[18] L. K. Grover. A fast quantum mechanical algorithm for database search. Proceedings of the 28th Annual ACM Symposium on the Theory of Computing. May 1996.

[19] D. Bernstein. Grover vs. McEliece. Post-Quantum Cryptography. LNCS 6061, Springer, 73-80, 2010.

[20] Robert J. McEliece. The Theory of Information and Coding. Reading, MA, Addison-Wesley, 1977.

[21] Robert J. McEliece. A public-key cryptosystem based on algebraic coding theory, JPL DSN Progress Report 42-44, pages 114-116, 1978.
http://ipnpr.jpl.nasa.gov/
progress_report2/42-44/44N.PDF

[22] Sherman Stein and Sandor Szabo. Algebra and Tiling. Homomorphisms in the Service of Geometry. Mathematical Association of America, 1994.

[23] R. L. Rivest, A. Shamir, and L. Adleman. A method for obtaining digital signatures and public-key cryptosystems. Communications of the ACM. 21, 120-126, 1978.

[24] Joseph H. Silverman and John Tate. Rational Points on Elliptic Curves. Springer-Verlag, 1992.

[25] Harold Edwards. A normal form for elliptic curves. Bulletin of the American Mathematical Society. 44: 393-422, April, 2007.

[26] Peter Montgomery. Speeding the Pollard and Elliptic Curve Methods of Factorization. Mathematics of Computation 48 (177): 243-264, 1987.

[27] A. J. Menezes, P. C. van Oorshot, and S. A. Vanstone. Handbook of Applied Cryptography. CRC Press, NY, 1997.

[28] Serge Vaudenay. Secure Communications over Insecure Channels Based on Short Authenticated Strings. Advances in Cryptology—CRYPTO 2005. 309-326, 2005.

The invention claimed is:

1. A machine-implemented method comprising:
a first machine and a second machine;
each machine including at least a processor system and a memory system;
the memory system storing one or more machine instructions;
which when implemented cause the processor system to implement the machine-implemented method including at least,
a first party generating with the first machine one or more private keys,
the first party computing with the first machine one or more public keys by applying mathematical operations to the one or more private keys;
the first party sending one or more of its public keys to a second party;
a second party generating with the second machine one or more private keys;
the second party computing with the second machine one or more public keys by applying mathematical operations to the second party's one or more private keys;
the second party sending one or more of its the second party's public keys to the first party;
the first party receiving the second party's one or more public keys;
the first party applying with the first machine mathematical operations between the first party's one or more private keys and the second party's one or more public keys,
wherein the mathematical operations resulting in a shared secret for the first party;
the second party receiving the first party's one or more public keys;
the second party applying with the second machine mathematical operations between the second party's one or more private keys and the first party's one or more public keys,
wherein the mathematical operations resulting in a shared secret for the second party;
the first party transforming the shared secret for the first party to one or more multiparty private keys that are distinct from the first party's private keys and distinct from the second party's private keys;
the first party computing with the first machine one or more multiparty public keys by applying mathematical operations to information that includes at least the one or more multiparty private keys, the mathematical operations only including operations upon information that is available to the second party;
the first party sending the one or more multiparty public keys to a third party that is distinct from the first party and distinct from the second party;
wherein the computing of the one or more public keys by the first party is performed by the first machine;
and wherein the computing of the one or more public keys by the second party is performed by the second machine, wherein said mathematical operations that are applied to the one or more multiparty private keys compute elliptic curve operations.

2. The machine-implemented method of claim 1 further comprising:
wherein the one or more multiparty public keys sent to the third party each have a size that is the same size as each of the public keys sent from the first party to the second party;
wherein the size stays constant with increases in how many parties exchange public keys.

3. The machine-implemented method of claim 1 further comprising:
the first party sending one or more public keys to a location outside the machine used by the first party.

4. The machine-implemented method of claim 1 further comprising:
at least one of the parties has a sensor or at least one of the parties uses at least one sensor.

5. The machine-implemented method of claim 1 wherein a non-deterministic system contributes to the generation of the first party's private keys.

6. The machine-implemented method of claim 5 further comprising:
the non-deterministic system is based at least on a behavior of photons.

7. The machine-implemented method of claim 6 further comprising:
emitting said photons from a light emitting diode.

8. A machine-implemented method comprising:
a first machine and a second machine, each machine including at least a processor system and a memory system;
the memory system storing one or more machine instructions;
which when implemented cause the processor system to implement the machine-implemented method including at least,
a first party generating with the first machine one or more private keys;
the first party computing with the first machine one or more public keys by applying mathematical operations to the one or more private keys;
the first party sending one or more of its public keys to a second party;
the second party generating with the second machine one or more private keys;
the second party computing with the second machine one or more public keys by applying mathematical operations to the second party's one or more private keys;
the second party sending one or more of its the second party's public keys to the first party;
the first party receiving the second party's one or more public keys;
the first party applying mathematical operations between the first party's one or more private keys and the second party's one or more public keys, wherein the mathematical operations resulting in a shared secret for the first party;
the second party receiving the first party's one or more public keys;
the second party applying mathematical operations between the second party's one or more private keys and the first party's one or more public keys, wherein the mathematical operations resulting in a shared secret for the second party;
the first party transforming, by the system, the shared secret for the first party to one or more multiparty private keys that are distinct from the first party's private keys and distinct from the second party's private keys;
the first party computing one or more multiparty public keys by applying mathematical operations to information that includes at least the one or more multiparty private keys, the mathematical operations only including operations upon information that is available to the second party;

the first party sending the one or more multiparty public keys to a third party that is distinct from the first party and distinct from the second party;

wherein the computing of the one or more public keys by the first party is performed by the first machine;

and wherein the computing of the one or more public keys by the second party is performed by the second machine;

wherein said mathematical operations that are applied to the one or more multiparty private keys compute lattice operations.

9. The machine-implemented method of claim 8 wherein a non-deterministic system contributes to the generation of the first party's private keys.

10. The machine-implemented method of claim 9 further comprising:

the non-deterministic system is based at least on a behavior of photons.

11. The machine-implemented method of claim 10 further comprising:

emitting said photons from a light emitting diode.

12. The machine-implemented method of claim 8 further comprising:

the first party sending one or more public keys to a location outside the machine used by the first party.

13. The machine-implemented method of claim 8 further comprising:

at least one of the parties has a sensor or at least one of the parties uses at least one sensor.

14. The machine-implemented method of claim 8 further comprising:

wherein the one or more multiparty public keys sent to the third party each have a size that is the same size as each of the public keys sent from the first party to the second party;

wherein the size stays constant with increases in how many parties exchange public keys.

15. A machine-implemented method comprising:

a first machine and a second machine;

each machine including at least a processor system and a memory system;

the memory system storing one or more machine instructions;

which when implemented cause the processor system to implement the machine-implemented method;

a first party generating with the first machine one or more private keys, wherein the one or more private keys of the first party include a machine-generated random sequence of characters of the first party that is generated automatically;

the first party computing, with the first machine, one or more public keys by applying mathematical operations to the one or more private keys; the first party sending, by the machine, one or more of its public keys to a second party;

the second party generating, with the second machine, one or more private keys;

the second party computing, with the second machine, one or more public keys by applying mathematical operations to the second party's one or more private keys;

the second party sending one or more of its the second party's public keys to the first party;

the first party receiving the second party's one or more public keys;

the first party applying with the first machine mathematical operations between the first party's one or more private keys and the second party's one or more public keys, wherein the mathematical operations resulting in a shared secret for the first party;

the second party receiving the first party's one or more public keys;

the second party applying with the second machine mathematical operations between the second party's one or more private keys and the first party's one or more public keys, wherein the mathematical operations resulting in a shared secret for the second party;

the first party transforming with the first machine the shared secret for the first party to one or more multiparty private keys that are distinct from the first party's private keys and distinct from the second party's private keys;

the first party computing with the first machine one or more multiparty public keys by applying mathematical operations to information that includes at least the one or more multiparty private keys, the mathematical operations only including operations upon information that is available to the second party;

the first party sending the one or more multiparty public keys to a third party that is distinct from the first party and distinct from the second party;

wherein said mathematical operations that are applied to the one or more multiparty private keys compute Goppa code operations.

16. The machine-implemented method of claim 15 wherein a non-deterministic system contributes to the generation of the first party's private keys.

17. The machine-implemented method of claim 16 further comprising:

the non-deterministic system is based at least on a behavior of photons.

18. The machine-implemented method of claim 17 further comprising:

emitting said photons from a light emitting diode.

19. The machine-implemented method of claim 15 further comprising:

the first party sending one or more public keys to a location outside the machine used by the first party.

20. The machine-implemented method of claim 15 further comprising:

at least one of the parties has a sensor or at least one of the parties uses at least one sensor.

21. The machine-implemented method of claim 15 further comprising:

a non-deterministic process contributes to the generation of the first party's private keys.

22. The machine-implemented method of claim 15 further comprising:

wherein the one or more multiparty public keys sent to the third party each have a size that is the same size as each of the public keys sent from the first party to the second party;

wherein the size stays constant with increases in how many parties exchange public keys.

* * * * *